United States Patent
Ichikawa

(10) Patent No.: US 9,103,674 B2
(45) Date of Patent: Aug. 11, 2015

(54) SENSOR ELEMENT, METHOD FOR MANUFACTURING SENSOR ELEMENT, SENSOR DEVICE, AND ELECTRONIC APPARATUS

(75) Inventor: Fumio Ichikawa, Ebina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 315 days.

(21) Appl. No.: 13/605,444

(22) Filed: Sep. 6, 2012

(65) Prior Publication Data

US 2013/0081473 A1    Apr. 4, 2013

(30) Foreign Application Priority Data

Sep. 29, 2011   (JP) ................. 2011-214425

(51) Int. Cl.
*G01H 11/06*    (2006.01)
*G01C 19/5621*   (2012.01)

(52) U.S. Cl.
CPC .................. *G01C 19/5621* (2013.01)

(58) Field of Classification Search
CPC .......... G01H 11/06; G01H 11/08; G01H 1/00
USPC .......................................... 73/658
See application file for complete search history.

(56) References Cited

U.S. PATENT DOCUMENTS

| | | |
|---|---|---|
| 4,954,741 A | 9/1990 | Furutsu et al. |
| 5,343,749 A | 9/1994 | Macy |
| 5,522,249 A | 6/1996 | Macy |
| 5,866,816 A | 2/1999 | Hulsing, II |
| 7,975,546 B2 | 7/2011 | Noguchi et al. |
| 8,701,487 B2 * | 4/2014 | Naruse et al. ............. 73/504.12 |
| 2012/0126664 A1 | 5/2012 | Ogura et al. |
| 2013/0074597 A1 | 3/2013 | Ichikawa |
| 2013/0081473 A1 | 4/2013 | Ichikawa |

FOREIGN PATENT DOCUMENTS

| | | |
|---|---|---|
| JP | A-05-256723 | 10/1993 |
| JP | A-08-327366 | 12/1996 |
| JP | A-10-078326 | 3/1998 |

(Continued)

OTHER PUBLICATIONS

U.S. Appl. No. 13/611,532, filed Sep. 12, 2012, Ichikawa.

(Continued)

*Primary Examiner* — Hezron E Williams
*Assistant Examiner* — Rodney T Frank
(74) *Attorney, Agent, or Firm* — Oliff PLC

(57) ABSTRACT

A sensor element includes a base part 21, drive vibration arms 221 and 222, adjustment vibration arms 241-244 that vibrate in response to drive vibration of the drive vibration arms 221 and 222, detection electrodes that output a charge according to a physical quantity applied to the drive vibration arms 221 and 222, first adjustment electrodes provided on the adjustment vibration arms 241 and 242 and electrically connected to the detection electrodes for outputting a charge in response to vibration of the adjustment vibration arms 241 and 242, and second adjustment electrodes provided on the adjustment vibration arms 243 and 244 and electrically connected to the detection electrodes for outputting a charge in a reverse polarity with respect to the first adjustment electrodes in response to vibration of the adjustment vibration arms 243 and 244.

16 Claims, 21 Drawing Sheets

(56) References Cited

FOREIGN PATENT DOCUMENTS

| JP | A-2006-054602 | 2/2006 |
| JP | A-2008-014887 | 1/2008 |
| JP | A-2008-209215 | 9/2008 |
| JP | A-2012-112748 | 6/2012 |

OTHER PUBLICATIONS

U.S. Appl. No. 13/608,480, filed Sep. 10, 2012, Ichikawa.

* cited by examiner

SENSOR ELEMENT, METHOD FOR MANUFACTURING SENSOR ELEMENT, SENSOR DEVICE, AND ELECTRONIC APPARATUS

BACKGROUND

1. Technical Field

The present invention relates to sensor elements, methods for manufacturing a sensor element, sensor devices and electronic apparatuses.

2. Related Art

Angular velocity sensors (vibration gyro sensors) have been known (see, for example, JP-A-2008-14887 (Patent Document 1)) as sensor elements that are used for body control in vehicles, self-position detection of car navigation systems, vibration control and compensation systems (such as, shake compensation) for digital cameras, digital video cameras, and the like, and detect physical quantity, such as, angular velocity, acceleration and the like. For example, an angular velocity sensor described in Patent Document 1 has a tuning-fork element formed from two arms and a connection section that connects one ends of these two arms. Also, in the angular velocity sensor described in Patent Document 1, the tuning-fork element is formed from non-piezoelectric material, and each of the arms is provided with a driving section made of a pair of electrodes and a piezoelectric thin film sandwiched therebetween and a detecting section.

In the angular velocity sensor described in Patent Document 1, a voltage is applied between the pair of electrodes of the driving section, thereby flexurally vibrating (driving) the arms. In this driving state, when the arms receive an angular velocity about their axis extending along the arm's longitudinal direction, the arms bend in a direction orthogonal to the driving direction due to Coriolis force, and a charge according to the amount of the bend is detected by the pair of electrodes. The angular velocity can be detected based on the detected charge.

The tuning-fork element having the two arms described above may generally be formed by etching a substrate. However, it is difficult to obtain accurate dimensions of the tuning-fork element according to the design due to etching anisotropy of the substrate, variations in working process, and the like. As a result, the tuning-fork may be formed into a shape that is not originally intended, such that the arms may bend in a direction that is different from the driving direction, even when the arms are not subjected to an angular velocity. If a charge that is generated by the pair of electrodes at the detecting section, which may be caused by such bending of the arms, is detected, the detection accuracy would be deteriorated.

Therefore, according to the angular velocity sensor described in Patent Document 1, a portion of one of the pair of electrodes at the detecting section 1 is removed, thereby adjusting the amount of charge to be outputted from the pair of electrodes at the detection section in the state where no angular velocity is applied to the arms. However, according to the angular velocity sensor described in Patent Document 1, it is difficult to make highly accurate adjustment of the amount of charge to be outputted from the pair of electrodes at the detection section.

SUMMARY

In accordance with some aspects of the invention, sensor elements that can readily and reliably exhibit excellent detection sensitivity, methods for manufacturing such sensor elements, sensor devices using such sensor elements can be provided. Also, highly reliable electronic apparatuses equipped with such a sensor device can be provided.

An advantage of some aspects of the invention is to solve at least a part of the problem described above, and the invention can be implemented as the following embodiments and application examples.

Application Example 1

A sensor element in accordance with an embodiment of the invention includes: a base part; a drive vibration arm for vibrational drive that extends from the base part; a first vibration arm and a second vibration arm that extend from the base part and vibrate in response to drive vibration of the drive vibration arm; a detection part including a detection electrode that outputs a signal according to a physical quantity applied to the drive vibration arm; a first electrode provided on the first vibration arm and electrically connected to the detection electrode for generating a charge in response to vibration of the first vibration arm; and a second electrode provided on the second vibration arm and electrically connected to the detection electrode for generating a charge in a reverse polarity with respect to the first electrode in response to vibration of the second vibration arm. The sensor element thus configured can output a sensor output that combines a charge amount generated at the detection electrode with a difference between a charge amount generated at the first electrode and a charge amount generated at the second electrode.

By removing a portion or the entirety of the first electrode or the second electrode, the amount of charge to be generated at the first electrode or the second electrode can be reduced, and thus the sensor output can be adjusted. In other words, the sensor output can be adjusted (corrected) such that the sensor output in the state in which no physical quantity is applied to the sensor element becomes a desired reference value (for example, zero). In particular, charges in mutually reverse polarities are generated at the first electrode and the second electrode. Therefore, in either of the cases where the sensor output in the state in which no physical quantity is applied to the sensor element is larger or smaller than a desired reference value, the sensor output in the state in which no physical quantity is applied to the sensor element can be adjusted to the desired reference value, through selecting one of the first electrode and the second electrode and removing a portion or the entirety of the selected electrode.

Application Example 2

In the sensor element in accordance with an aspect of the invention, an added value of the charge from the first electrode and the charge from the second electrode may preferably be in a reverse polarity with respect to a charge generated at the detection electrode when no physical quantity is applied to the drive vibration arm. Accordingly, the sensor output can be adjusted (corrected) such that the sensor output in the state in which no physical quantity is applied to the sensor element becomes a desired reference value (for example, zero).

Application Example 3

In the sensor element in accordance with an aspect of the invention, each of the first electrode and the second electrode may be equipped with a pair of principal surface electrodes and a pair of side surface electrodes. When the first vibration arm and the second vibration arm vibrate in mutually the same phase, it is preferred that the principal surface electrodes on the first electrode and the side surface electrodes on the second electrode may be mutually connected, and the side surface electrodes on the first electrode and the principal surface electrodes on the second electrode may be mutually connected. Accordingly, the sensor output can be adjusted (corrected) such that the sensor output in the state in which no physical quantity is applied to the sensor element becomes a desired reference value (for example, zero).

Application Example 4

In the sensor element in accordance with an aspect of the invention, each of the first electrode and the second electrode may be equipped with a pair of principal surface electrodes and a pair of side surface electrodes. When the first vibration arm and the second vibration arm vibrate in mutually reverse phases, it is preferred that the principal surface electrodes on the first electrode and the principle surface electrodes on the second electrode may be mutually connected, and the side surface electrodes on the first electrode and the side surface electrodes on the second electrode may be mutually connected. Accordingly, the sensor output can be adjusted (corrected) such that the sensor output in the state in which no physical quantity is applied to the sensor element becomes a desired reference value (for example, zero).

Application Example 5

In the sensor element in accordance with an aspect of the invention, at least one of the first electrode and the second electrode may be equipped with a common part that extends in an extension direction of the first vibration arm or the second vibration arm, and plural branch parts branching out from the common part. Accordingly, at least one of the branch parts among the plural branch parts on the first electrode or the second electrode or the common part can be cut midway, such that the amount of charge to be generated at the first electrode or the second electrode can be reduced, whereby the sensor output can be adjusted.

In particular, the plural branch parts branch out from the common part, such that, even when any desired one of the branch parts is cut off, the remaining portion of the branch parts can maintain their electrically connected state with the detection electrode. Further, the plural branch parts are arranged side by side along the extension direction of the first vibration arm or the second vibration arm, such that the sensor output can be readily and highly accurately adjusted according to the position and the number of the branch parts to be cut off.

Application Example 6

In the sensor element in accordance with an aspect of the invention, it is preferred that each of the plural branch parts may have an electrode width greater on the side of a tip portion thereof than on the side of the common part. Accordingly, the first electrode and the second electrode can each secure a large electrode area before adjustment (before the common part or the branch parts are cut midway), a large adjustment range can be secured for adjusting the sensor output through cutting off the common part or the branch parts midway, and mid portions of the branch parts can be relatively, readily cut.

Application Example 7

In the sensor element in accordance with an aspect of the invention, it is preferred that the plural branch parts may be inclined with respect to the extension direction of the common part. Accordingly, mid portions of the branch parts can be readily cut.

Application Example 8

In the sensor element in accordance with an aspect of the invention, it is preferred that the plural branch parts may branch out on both sides of the common part. Accordingly the charge to be outputted from the common part can be made smaller. Therefore, adjustment of the sensor output can be readily performed. Also, the first electrode and the second electrode can each secure a large electrode area before adjustment (before the common part or the branch parts are cut off midway).

Application Example 9

In the sensor element in accordance with an aspect of the invention, at least one of the first vibration arm and the second vibration arm may have a groove portion provided along the extension direction thereof, and at least a part of the plural branch parts may preferably be provided on a wall surface of the groove part. Accordingly, when the first vibration arm and the second vibration arm are comprised of piezoelectric material, a relatively large amount of charge can be generated at the first electrode and the second electrode. Therefore, the range of adjustment of the sensor output can be made greater.

Application Example 10

In the sensor element in accordance with an aspect of the invention, it is preferred that the first vibration arm and the second vibration arm may be provided in one piece, and extend in mutually opposite directions. Accordingly, each of the first vibration arm and the second vibration arm can be effectively vibrated in response to drive vibration of the drive vibration arm with a relatively simple configuration.

Application Example 11

In the sensor element in accordance with an aspect of the invention, a mass adjustment section may preferably be provided at a tip section of each of the first vibration arm and the second vibration arm. Accordingly, the resonance frequency of each of the first vibration arm and the second vibration arm can be adjusted independently. Therefore the resonance frequency of each of the first vibration arm and the second vibration arm can be made closer to the drive vibration frequency of the drive vibration arm, whereby the amplitude of vibration of the first vibration arm and the second vibration arm in response to the drive vibration of the drive vibration arm can be made greater, and the amount of charge to be generated at the first electrode and the second electrode can be made greater accordingly. As a result, the range of adjustment of the sensor output can be made greater.

Application Example 12

In the sensor element in accordance with an aspect of the invention, it is preferred that the detection part may have a detection vibration arm that extends from the base part, and vibrates according to a physical quantity applied to the drive vibration arm, and the detection electrode may be provided on the detection vibration arm. Accordingly, the detection electrode can secure a large electrode area. Therefore, the detection sensitivity of the sensor element can be improved.

Application Example 13

Another embodiment of the invention pertains to a method for manufacturing a sensor element that includes a base part; a drive vibration arm for vibrational drive that extends from the base part; a first vibration arm and a second vibration arm that extend from the base part and vibrate in response to vibrational drive of the drive vibration arm; a detection part including a detection electrode that outputs a signal according to a physical quantity applied to the drive vibration arm; a first electrode provided on the first vibration arm and electrically connected to the detection electrode for generating a charge in response to vibration of the first vibration arm; and a second electrode provided on the second vibration arm and electrically connected to the detection electrode for generating a charge in a reverse polarity with respect to the first electrode in response to vibration of the second vibration arm, and the method includes a charge adjustment process for adjusting the amount of charge to be generated at the first electrode or the second electrode by removing a portion or the entirety of the first electrode or the second electrode. According to the method for manufacturing a sensor element, excellent detection sensitivity can be readily and securely exhibited.

Application Example 14

In the method for manufacturing a sensor element in accordance with an aspect of the invention, it is preferred that the method may include, before performing the charge adjustment, measuring a charge generated at the detection electrode in a state in which the drive vibration arm is energized to vibrate, and adjusting the resonance frequency of at least one of the first vibration arm and the second vibration arm based on the result of the measurement. Accordingly, excellent detection sensitivity can be readily and securely exhibited.

Application Example 15

A sensor device in accordance with an embodiment of the invention includes the sensor element in accordance with one of the aspects described above, a circuit for driving the drive vibration arm, and a circuit for detecting an output from the detection electrode. Accordingly, a sensor device with excellent detection sensitivity can be provided.

Application Example 16

An electronic apparatus in accordance with an embodiment of the invention has the sensor element in accordance with at least one of the aspects described above. Accordingly, an electronic apparatus having excellent reliability can be provided.

DESCRIPTION OF EXEMPLARY EMBODIMENTS

Sensor elements, characteristic adjustment methods for the sensor elements, sensor devices and electronic apparatuses in accordance with embodiments of the invention will be described below with reference to the accompanying drawings.

First Embodiment+

Figure 1:
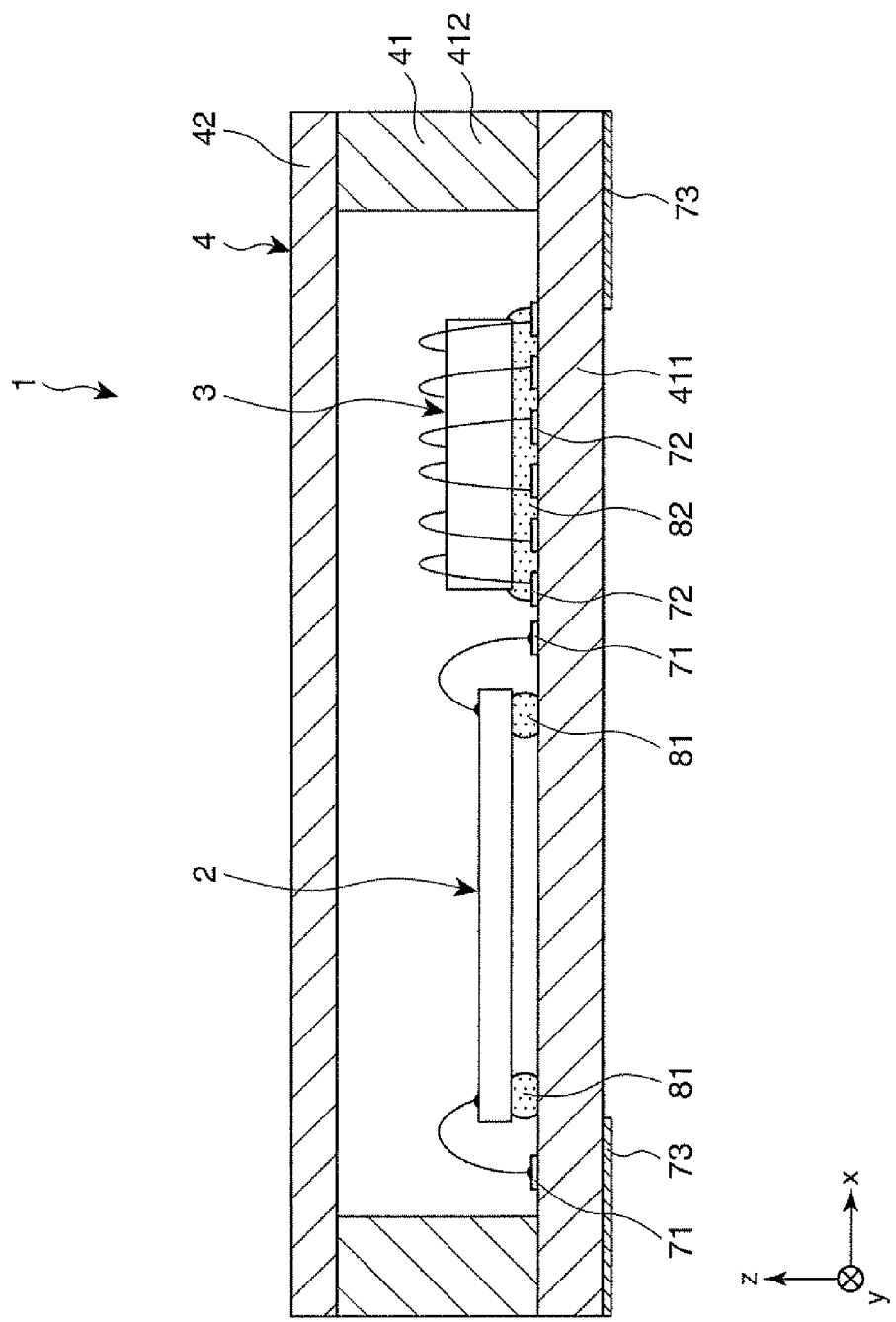
FIG. 1 is a schematic cross-sectional view briefly showing the composition of a sensor device (an electronic device) in accordance with a first embodiment of the invention.
Figure 2:
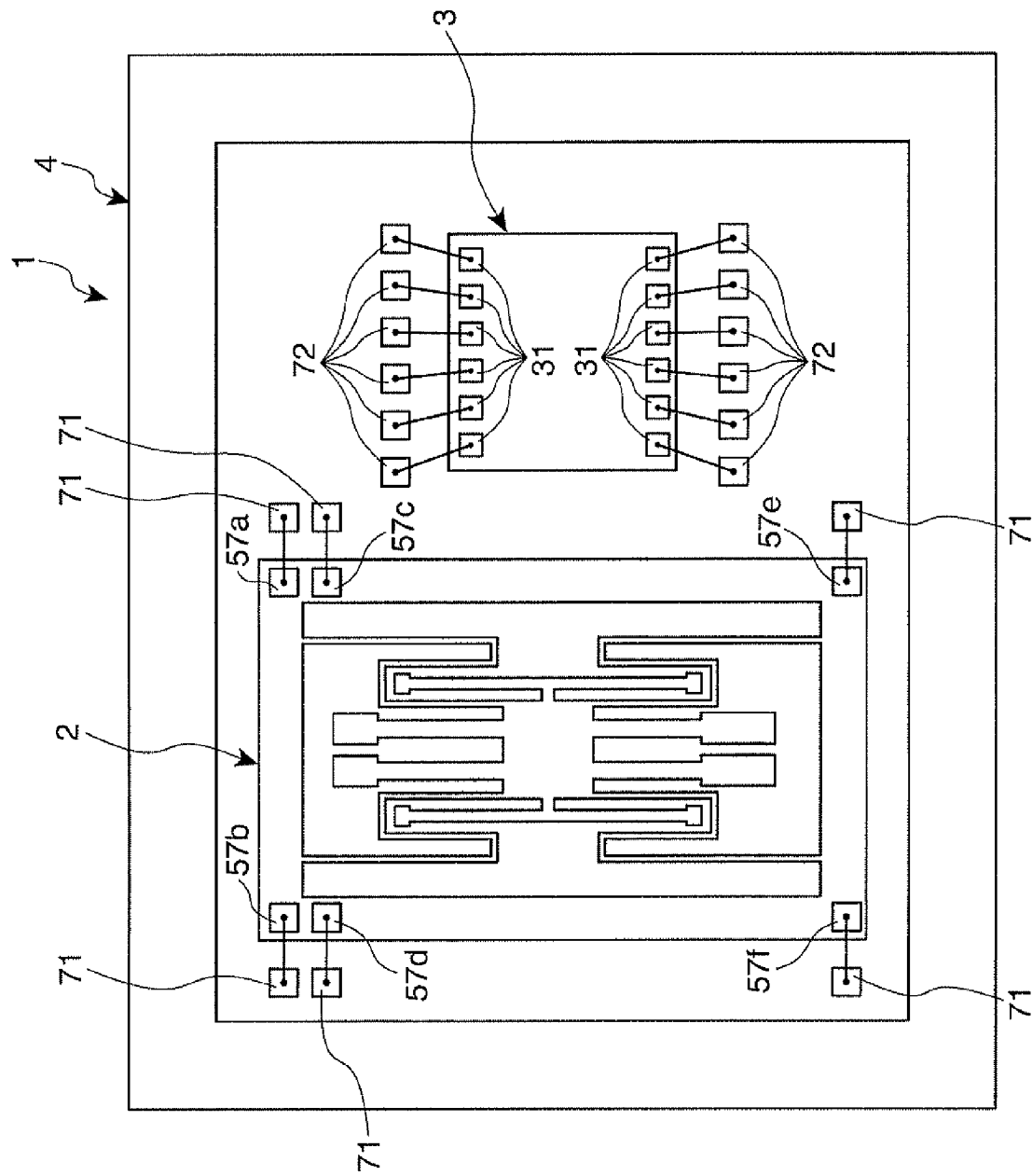
FIG. 2 is a plan view of the sensor device shown in FIG. 1.
Figure 3:
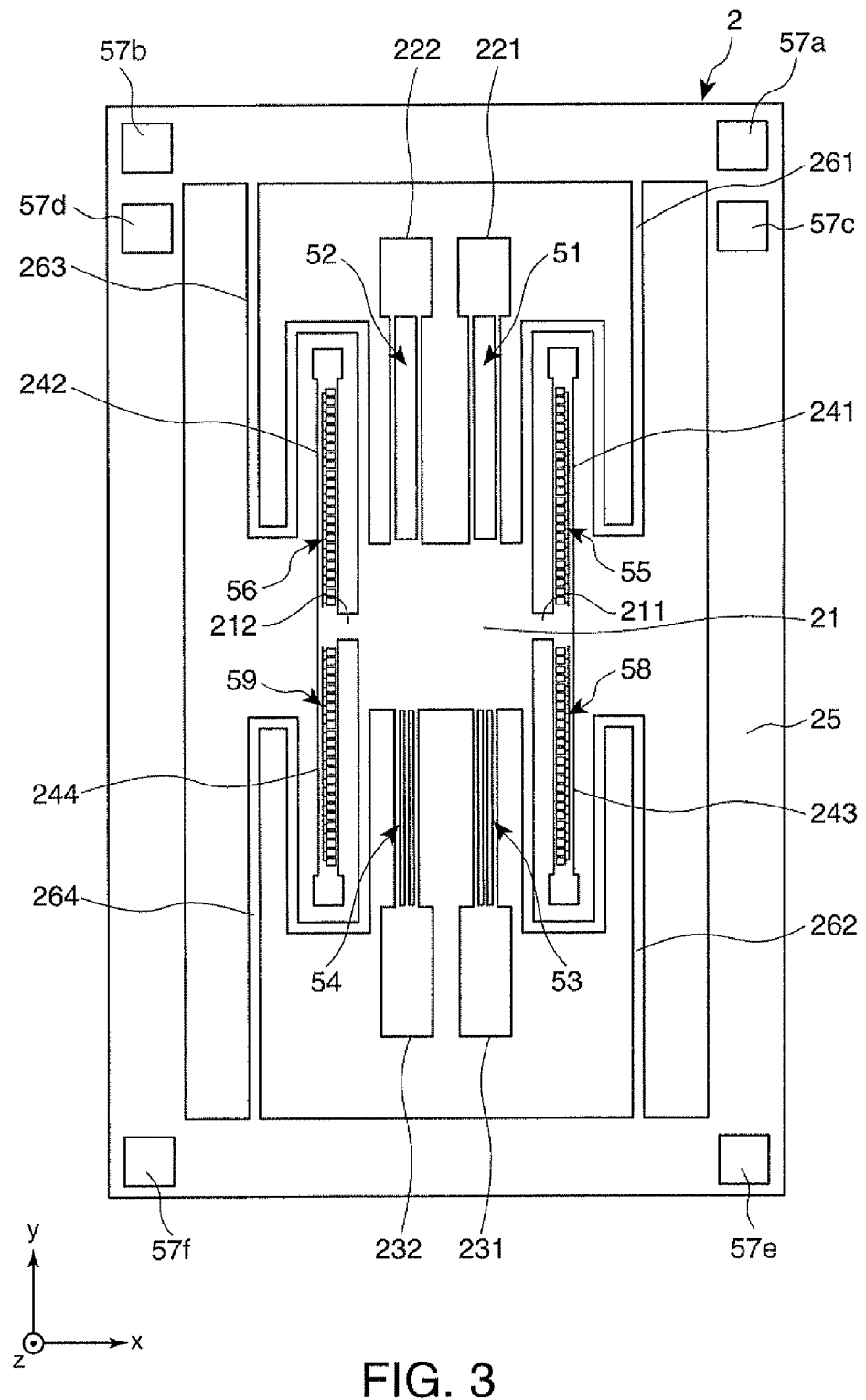
FIG. 3 is a plan view showing a sensor element provided in the sensor device shown in FIG. 1.
Figure 4A:
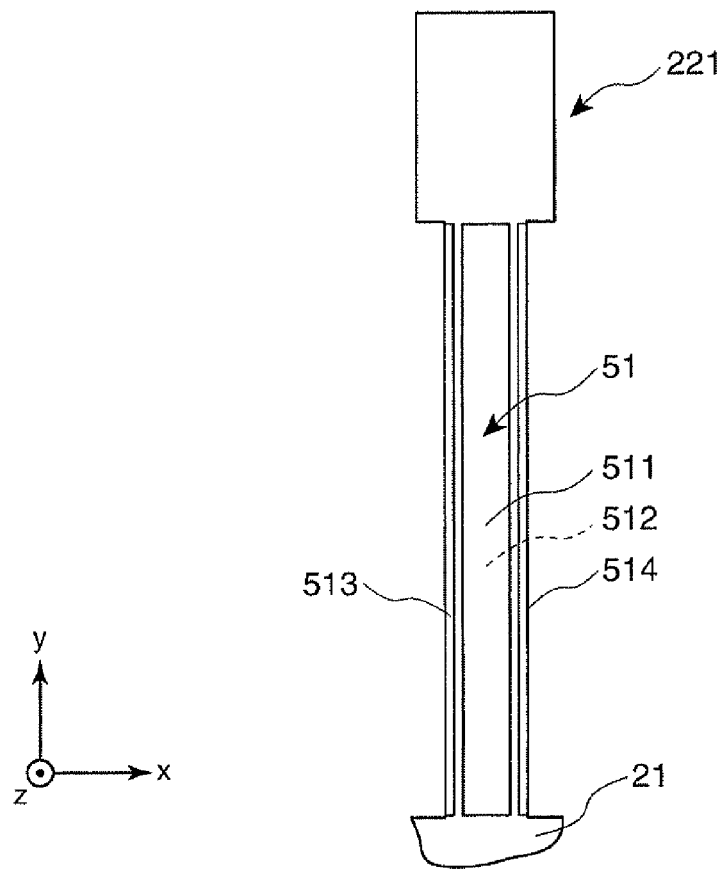
FIG. 4A is an enlarged plan view of a drive vibration arm of the sensor element shown in FIG. 3.
Figure 4B:
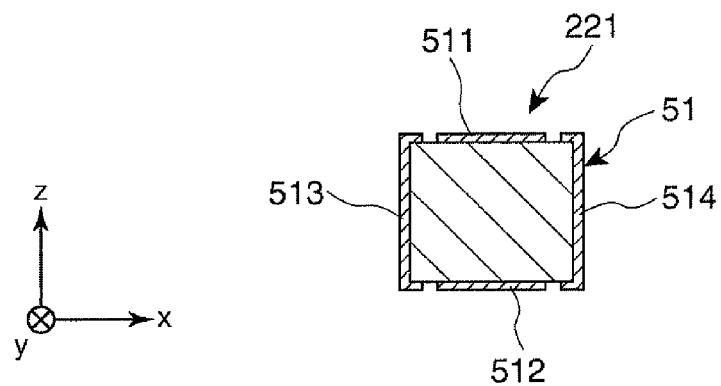
FIG. 4B is a cross-sectional view of the drive vibration arm shown in FIG. 4A.
Figure 5A:
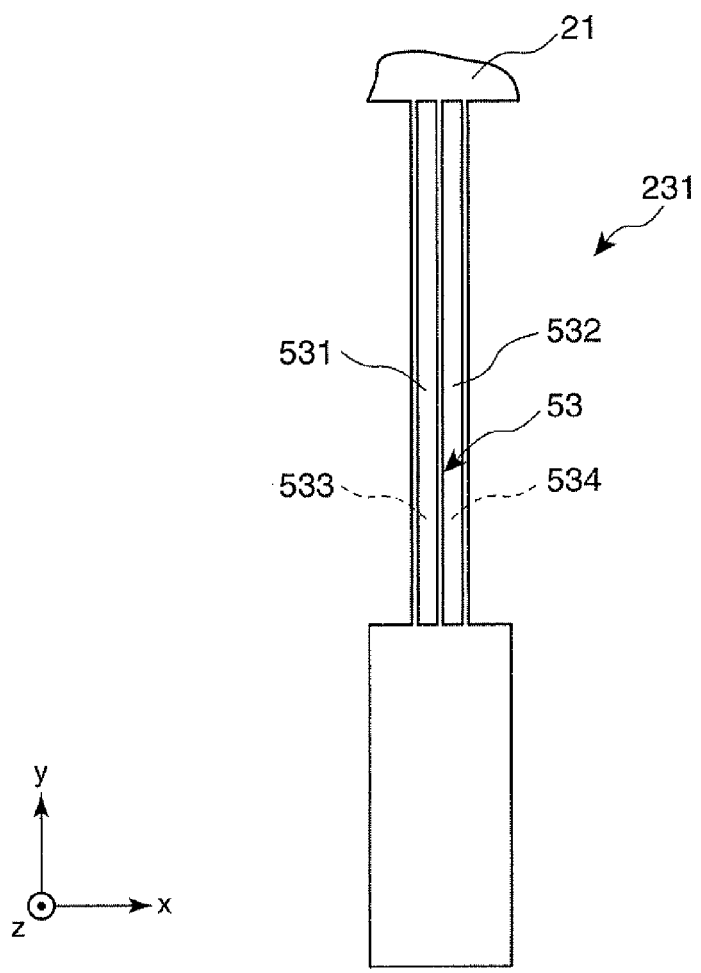
FIG. 5A is an enlarged plan view of a detection vibration arm of the sensor element shown in FIG. 3.
Figure 5B:
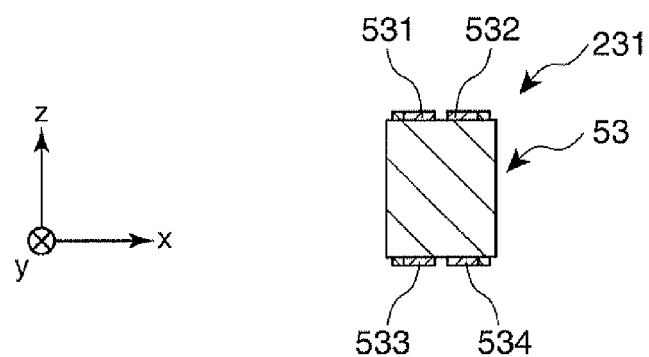
FIG. 5B is a cross-sectional view of the detection vibration arm shown in FIG. 5A.
Figure 6A:
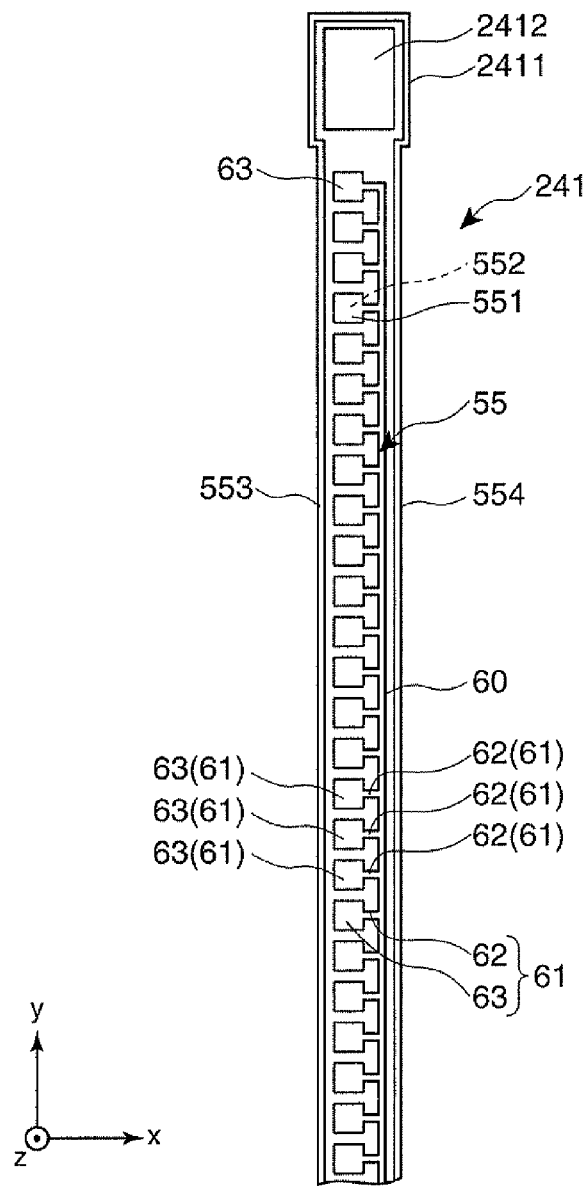
FIG. 6A is an enlarged plan view of a first adjustment vibration arm of the sensor element shown in FIG. 3.
Figure 6B:
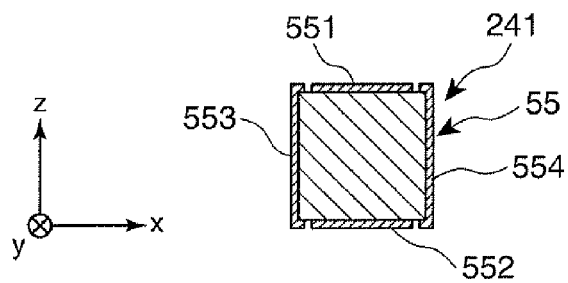
FIG. 6B is a cross-sectional view of the first adjustment vibration arm shown in FIG. 6A.
Figure 7A:
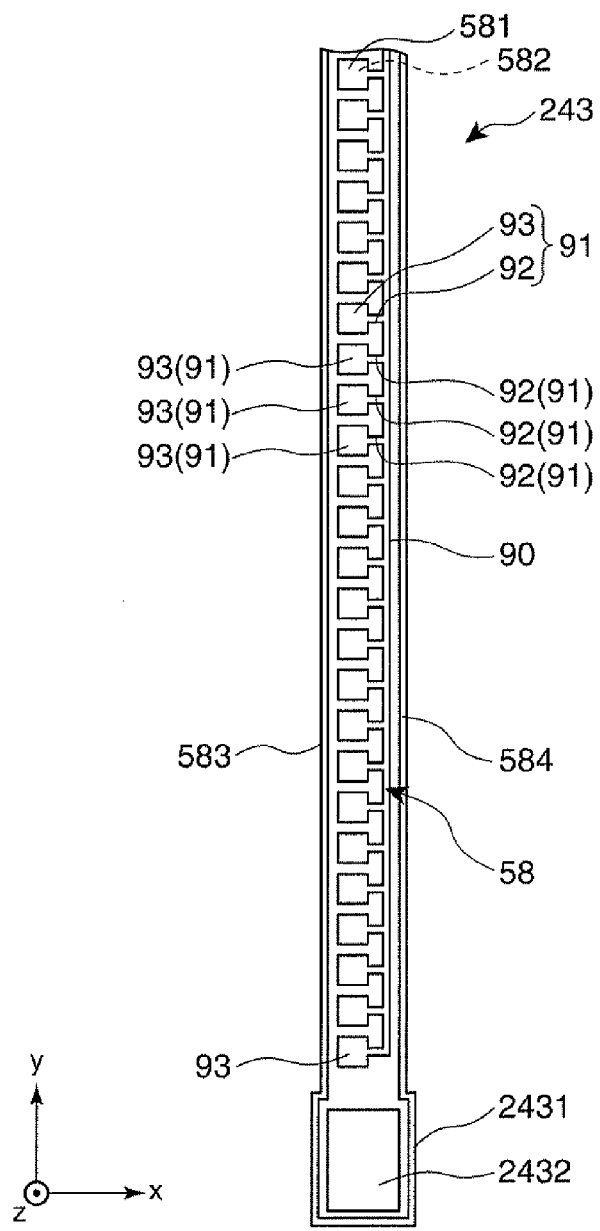
FIG. 7A is an enlarged plan view of a second adjustment vibration arm of the sensor element shown in FIG. 3.
Figure 7B:
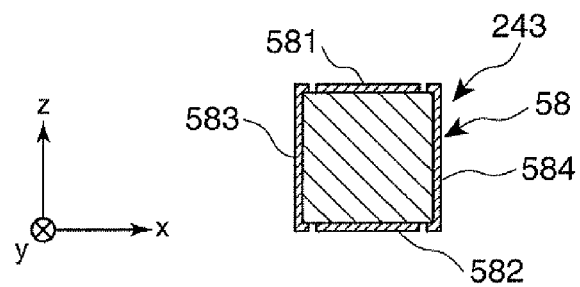
FIG. 7B is a cross-sectional view of the second adjustment vibration arm shown in FIG. 7A.
Figure 8:
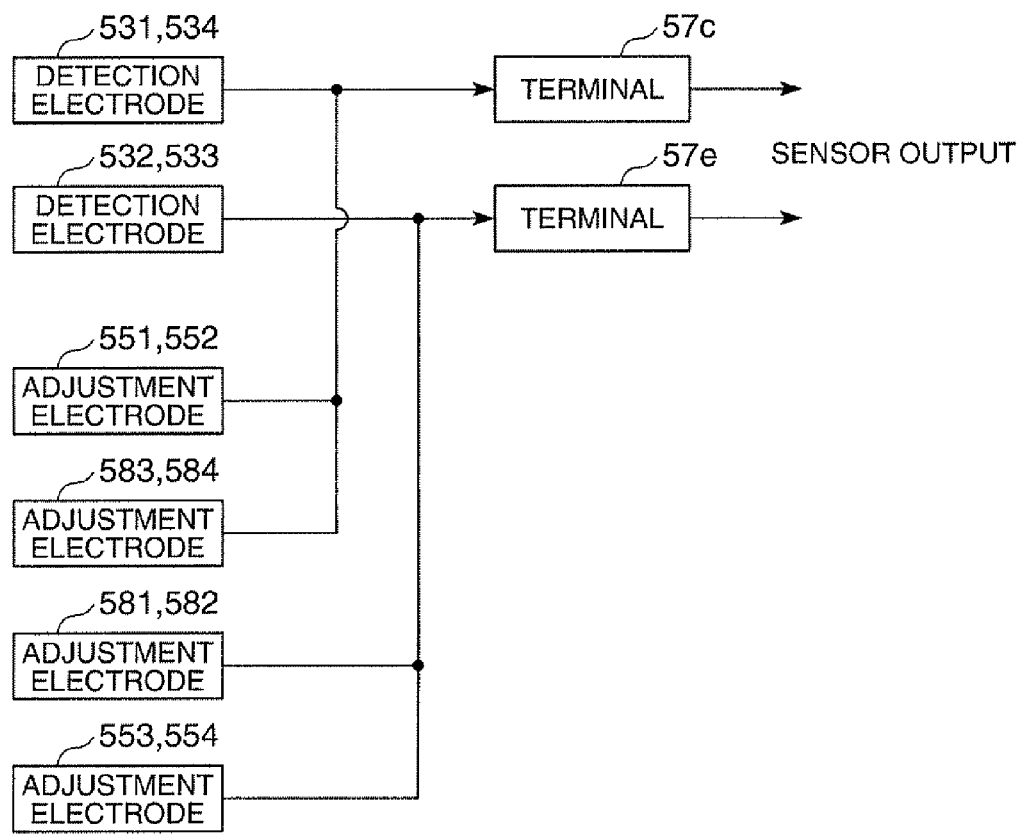
FIG. 8 is a diagram showing a connection state of detection electrodes and adjustment electrodes in the sensor element shown in FIG. 3.
Figure 9:
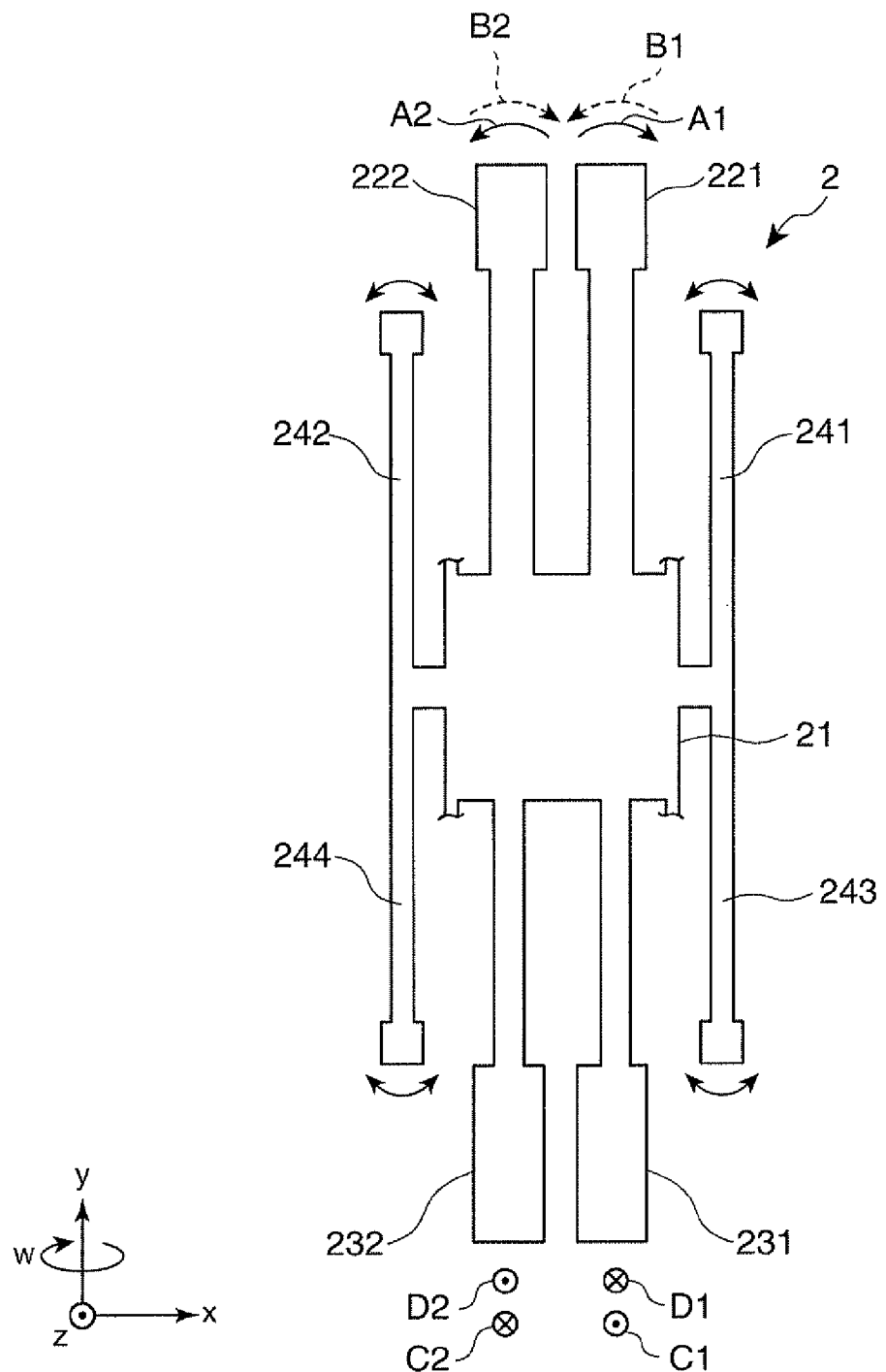
FIG. 9 is a diagram for describing the operation of the sensor element shown in FIG. 3.
Figure 10A:
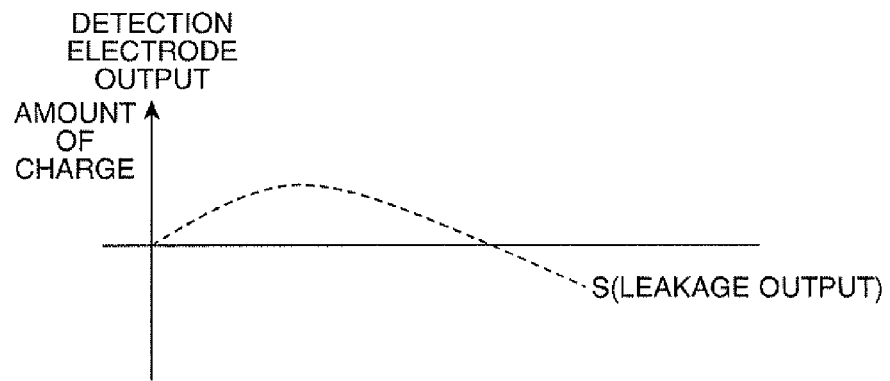
FIG. 10A is a graph showing leakage output of the detection electrode shown in FIG. 5.
Figure 10B:
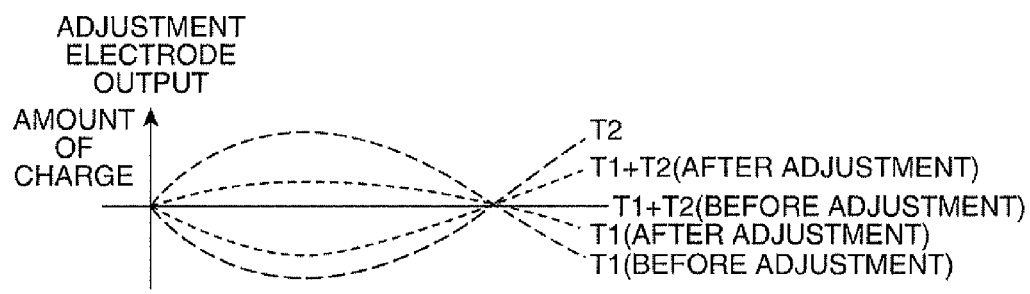
FIG. 10B is a graph showing output of the adjustment electrode shown in FIGS. 6 and 7.

A first embodiment of the invention will be described. FIG. 1 is a schematic cross-sectional view briefly showing the composition of a sensor device (an electronic device) in accordance with the first embodiment of the invention. FIG. 2 is a plan view of the sensor device shown in FIG. 1. FIG. 3 is a plan view showing a sensor element provided in the sensor device shown in FIG. 1. FIG. 4A is an enlarged plan view of a drive vibration arm of the sensor element shown in FIG. 3, and FIG. 4B is a cross-sectional view of the drive vibration arm shown in FIG. 4A. FIG. 5A is an enlarged plan view of a detection vibration arm of the sensor element shown in FIG. 3, and FIG. 5B is a cross-sectional view of the detection vibration arm shown in FIG. 5A. FIG. 6A is an enlarged plan view of a first adjustment vibration arm of the sensor element shown in FIG. 3, and FIG. 6B is a cross-sectional view of the first adjustment vibration arm shown in FIG. 6A. FIG. 7A is an enlarged plan view of a second adjustment vibration arm of the sensor element shown in FIG. 3, and FIG. 7B is a cross-sectional view of the second adjustment vibration arm shown in FIG. 7A. FIG. 8 is a diagram showing a connection state of detection electrodes and adjustment electrodes in the sensor element shown in FIG. 3. FIG. 9 is a diagram for describing the operation of the sensor element shown in FIG. 3. FIG. 10A is a graph showing leakage output of the detection electrode shown in FIG. 5, and FIG. 10B is a graph showing output of the adjustment electrode shown in FIGS. 6 and 7. For the sake of convenience of description, FIGS. 1-7 show x-axis, y-axis and z-axis, as mutually orthogonal three axes, the direction in parallel with the x-axis is defined as the "x-axis direction," the direction in parallel with the y-axis is defined as the "y-axis direction," and the direction in parallel with the z-axis is defined as the "z-axis direction." Also, the + side of the z-axis is defined as the "upper" side, and the − side of the z-axis is defined as the "lower" side.

Sensor Device

A sensor device 1 shown in FIG. 1 and FIG. 2 is a gyro sensor that detects an angular velocity as a physical quantity. The sensor device 1 may be used for shake compensation for imaging devices, and for position detection and position control in vehicles equipped with mobile navigation systems using GPS (Global Positioning System) satellite signals, and the like. The sensor device 1 has, as shown in FIG. 1 and FIG. 2, a sensor element 2, an IC chip 3, and a package 4 that houses the sensor element 2 and the IC chip 3. The components forming the sensor device 1 will be described below.

Sensor Element 2

The sensor element 2 is a gyro sensor element that detects an angular velocity about one axis. As shown in FIG. 3, the sensor element 2 has a base part 21, a pair of drive vibration arms 221 and 222, a pair of detection vibration arms 231 and 232, a pair of adjustment vibration arms 241 and 242 (referred to as first adjustment vibration arms, or first vibration arms), a pair of adjustment vibration arms 243 and 244 (referred to as second adjustment vibration arms, or second vibration arms), a support part 25, four connection parts 261, 262, 263 and 264, drive electrode groups 51 and 52, detection electrode groups 53 and 54, and adjustment electrode groups 55, 56, 58 and 59.

In accordance with the present embodiment, the base part 21, the pair of drive vibration arms 221 and 222, the pair of detection vibration arms 231 and 232, the pair of adjustment vibration arms 241 and 242, the pair of adjustment vibration arms 243 and 244, the support part 25, and the four connection parts 261, 262, 263 and 264 are formed in one piece from piezoelectric material. As the piezoelectric material, any material may be used without any particular limitation, but quartz crystal may preferably be used. With the use of quartz crystal, the sensor element 2 can have excellent characteristic.

The quartz crystal has X-axis called "electrical axis," Y-axis called "mechanical axis," and Z-axis called "optical axis." The base part 21, the pair of drive vibration arms 221 and 222, the pair of detection vibration arms 231 and 232, the pair of adjustment vibration arms 241 and 242, the pair of adjustment vibration arms 243 and 244, the support part 25, and the four connection parts 261, 262, 263 and 264 may be formed by etching a substrate of crystal quartz having the Z-axis in the thickness direction and having a plane surface in parallel with the X-axis and the Y-axis. It is noted that the thickness of the substrate is appropriately set according to an oscillation frequency (resonance frequency), outer size, workability, and the like of the sensor element 2. In an example to be described below, the base part 21, the pair of drive vibration arms 221 and 222, the pair of detection vibration arms 231 and 232, the pair of adjustment vibration arms 241 and 242, the pair of adjustment vibration arms 243 and 244, the support part 25, and the four connection parts 261, 262, 263 and 264 are formed in one piece from crystal quartz.

The base part 21 is supported on the support part 25 through the four connection parts 261, 262, 263 and 264. The four connection parts 261, 262, 263 and 264 each has an elongated shape, having one end connected to the base part 21, and another end connected to the support part 25. The drive vibration arms 221 and 222 each extend in the y-axis direction (+y direction) from the base part 21. Also, the drive vibration arms 221 and 222 each extend along the Y-axis of crystal quartz. Further, the drive vibration arms 221 and 222 each have a cross section in a rectangular shape composed of a pair of sides in parallel with the x-axis and a pair of sides in parallel with the z-axis. Further, the drive electrode group 51 is provided on the drive vibration arm 221 and, similarly, the drive electrode group 52 is provided on the drive vibration arm 222.

Here, the drive electrode group 51 will be described as representative of the drive electrode groups. Note that the drive electrode group 52 is the same as the drive electrode group 51, and therefore its description will be omitted. The drive electrode group 51, as shown in FIGS. 4A and 4B, is formed from a drive electrode 511 provided on the top surface of the drive vibration arm 221, a drive electrode 512 provided on the lower surface of the drive vibration arm 221, a drive electrode 513 provided on one of the side surfaces (on the left side in FIG. 4) of the drive vibration arm 221, and a drive electrode 514 provided on the other of the side surfaces (on the right side in FIG. 4) of the drive vibration arm 221.

The drive electrode 511 and the drive electrode 512 are electrically connected to each other via wires (not shown) to have the same potential. Also, the drive electrode 513 and the drive electrode 514 are electrically connected to each other via wires (not shown) to have the same potential. The drive electrodes 511 and 512 are electrically connected to a terminal 57a provided on the support part 25 shown in FIG. 3 via wires (not shown). Also, the drive electrodes 513 and 514 are electrically connected to a terminal 57b provided on the support part 25 shown in FIG. 3 via wires (not shown).

The detection vibration arms 231 and 232 each extend in the y-axis direction (−y direction) from the base part 21. Also, the detection vibration arms 231 and 232 each extend along the Y-axis of crystal quartz. Further, the detection vibration arms 231 and 232 each have a cross section in a rectangular shape composed of a pair of sides in parallel with the x-axis and a pair of sides in parallel with the z-axis. These detection vibration arms 231 and 232 vibrate according to a physical quantity applied to the drive vibration arms 221 and 222, respectively.

Further, the detection electrode group 53 is provided on the detection vibration arm 231 and, similarly, the detection electrode group 54 is provided on the detection vibration arm 232. In this manner, the detection electrode groups 53 and 54 are provided on the detection vibration arms 231 and 232 that are provided independently of the drive vibration arms 221 and 222, such that the detection electrodes of the detection electrode groups 53 and 54 can each have a greater electrode area (the area of a portion that functions as an electrode). Therefore, the detection sensitivity of the sensor element 2 can be improved.

Here, the detection electrode group 53 will be described as a representative of the detection electrode groups. Note that the detection electrode group 54 is the same as the detection electrode group 53, and therefore its description will be omitted. The detection electrode group 53, as shown in FIGS. 5A and 5B, is formed from detection electrodes 531 and 532 provided on the top surface of the detection vibration arm 231, and detection electrodes 533 and 534 provided on the lower surface of the detection vibration arm 231. Here, the detection electrodes 531 and 533 are provided on one side (on the left side in FIG. 5) in the width direction of the detection vibration arm 231, and the detection electrodes 532 and 534 are provided on the other side (on the right side in FIG. 5) in the width direction of the detection vibration arm 231.

The detection electrode 531 and the detection electrode 534 are electrically connected to each other via wires (not shown) to have the same potential. Also, the detection electrode 532 and the detection electrode 533 are electrically connected to each other via wires (not shown) to have mutually the same potential. The detection electrodes 531 and 534 are electrically connected to a terminal 57c provided on the support part 25 shown in FIG. 3 via wires (not shown). Also, the detection electrodes 532 and 533 are electrically connected to a terminal 57e provided on the support part 25 shown in FIG. 3 via wires (not shown). Note that the detection electrode group 54 is electrically connected to terminals 57d and 57f provided on the support part 25 shown in FIG. 3 via wires (not shown).

The adjustment vibration arms 241 and 242 (first adjustment vibration arms) each extend in the y-axis direction (+y direction) from the base part 21. On the other hand, the adjustment vibration arms 243 and 244 (second adjustment vibration arms) each extend in the y-axis direction (−y direction) from the base part 21.

In the present embodiment, a pair of arm parts 211 and 212 extend in the x-axis direction from both end sections of the base part 21 along the x-axis direction, the adjustment vibration arm 241 and the adjustment vibration arm 243 extend from tip sections of one of the arm parts (211), and the adjustment vibration arm 242 and the adjustment vibration arm 244 extend from tip sections of the other of the arm parts (212). By this configuration, the adjustment vibration arms 241-244 can be effectively vibrated in response to drive vibration of the drive vibration arms 221 and 222.

In this manner, the adjustment vibration arm 241 and the adjustment vibration arm 243 extend in mutually opposite directions from the base part 21. Similarly, the adjustment vibration arm 242 and the adjustment vibration arm 244 extend in mutually opposite directions from the base part 21. By this configuration, the adjustment vibration arms 241, 242, 243 and 244 can be effectively vibrated with a relatively simple configuration, in response to drive vibration of the drive vibration arms 221 and 222, respectively.

The adjustment vibration arms 241, 242, 243 and 244 extend along the Y-axis of quartz crystal, respectively. Further, the adjustment vibration arms 241, 242, 243 and 244 each have a cross section in a rectangular shape that is composed of a pair of sides extending in parallel with the x-axis and a pair of sides extending in parallel with the z-axis. Each of the adjustment vibration arms 241, 242, 243 and 244 has a first surface (front surface), a second surface (back surface) on the opposite side of the first surface, and a pair of side surfaces connecting the first surface and the second surface.

The adjustment vibration arms 241, 242, 243 and 244 are provided in parallel with the drive vibration arms 221 and 222 described above. In other words, the drive vibration arms 221 and 222 and the adjustment vibration arms 241, 242, 243 and 244 extend in parallel with one another. Accordingly, when the drive vibration arms 221 and 222 and the adjustment vibration arms 241, 242, 243 and 244 are composed of quartz crystal, the drive vibration arms 221 and 222 and the adjustment vibration arms 241, 242, 243 and 244 may be formed to extend in parallel with the Y-axis of quartz crystal, such that the drive vibration arms 221 and 222 can be effectively vibrated, and charges can be generated at the adjustment electrodes of the adjustment electrode groups 55, 56, 58 and 59 with relatively simple structure.

The adjustment vibration arms 241 and 242 are provided at their tip portions with mass portions 2411 and 2431 (weight portions) each being formed wider than the base portion of each of the adjustment vibration arms 241 and 242 (see FIG. 6A and FIG. 7A). Similarly, the adjustment vibration arms 242 and 244 are provided at their tip portions with mass portions (weight portions) each being formed wider than the base portion of each of the adjustment vibration arms 242 and 244. By this structure, the mass at the tip of each of the adjustment vibration arms 241-244 can be made greater, whereby the natural frequency (resonance frequency) of each of the adjustment vibration arms 241-244 can be made smaller, and the length of the adjustment vibration arms 241-244 can be suppressed to shorter length.

Further, the tip portions (the mass portions 2411 and 2431) of the adjustment vibration arms 241 and 243 are provided with mass adjustment films 2412 and 2432, respectively, in which a part or the entirety of each of the mass adjustment films can be removed if necessary (see FIG. 6A, and FIG. 7A).

By this structure, the resonance frequency of each of the adjustment vibration arms 241-244 can be adjusted. Therefore, the resonance frequency of each of the adjustment vibration arms 241-244 can be made closer to the frequency of drive vibration of the drive vibration arms 221 and 222, and the amplitude of vibration of each of the adjustment vibration arms 241-244 in response to the drive vibration of the drive vibration arms 221 and 222 can be made larger, such that the amount of charge generated at the adjustment electrodes of each of the adjustment electrode groups 55, 56, 58 and 59 can be made greater. As a result, the range of adjustment of sensor output (to be described below) can be made greater.

The mass adjustment films 2412 and 2432 may be composed of appropriate material without any particular limitation, but may preferably be composed of material having a greater specific gravity than that of the constituting material of the adjustment vibration arms 241-244, in view of the fact that the range of adjustment of the mass of each of the adjustment vibration arms 241-244 can be made greater. Also, the mass adjustment films 2412 and 2432 may preferably be composed of the same material (metal material) as that of the adjustment electrode groups 55, etc. in view of the fact that the mass adjustment films 2412 and 2432 can be formed together with the adjustment electrode groups 55, etc., and therefore the manufacturing process can be simplified.

The adjustment electrode group 55 is provided on the adjustment vibration arm 241, and the adjustment electrode group 56 is similarly provided on the adjustment vibration arm 242. Also, the adjustment electrode group 58 is provided on the adjustment vibration arm 243, and the adjustment electrode group 59 is similarly provided on the adjustment vibration arm 244. Here, the adjustment electrode groups 55 and 58 will be described as representative. Description of the adjustment electrode groups 56 and 59 will be omitted as they are similar in configuration to the adjustment electrode groups 55 and 58.

The adjustment electrode group 55 is formed from, as shown in FIGS. 6A and 6B, adjustment electrodes 551 (referred to as first adjustment electrodes or first electrodes) provided on the top surface of the adjustment vibration arm 241, adjustment electrodes 552 (referred to as first adjustment electrodes or first electrodes) provided on the lower surface of the adjustment vibration arm 241, adjustment electrodes 553 (referred to as first adjustment electrodes or first electrodes) provided on one of the side surfaces (on the left side in FIG. 6) of the adjustment vibration arm 241, and adjustment electrodes 554 (referred to as first adjustment electrodes or first electrodes) provided on the other of the side surfaces (on the right side in FIG. 6) of the adjustment vibration arm 241.

The adjustment electrodes (principle surface electrodes) 551 and the adjustment electrodes (principle surface electrodes) 552 are formed in a manner to overlap each other as viewed in a plan view. In other words, the adjustment electrodes 551 and the adjustment electrodes 552 are formed such that their outer shapes coincide with each other as viewed in a plan view. By the adjustment electrodes 551 and the adjustment electrodes 552 thus formed, when branch parts 61 of the adjustment electrodes 551 are cut, as described below, branch parts (not shown) of the adjustment electrodes 552 corresponding to the cut branch parts 61 can be cut at the same time.

The adjustment electrodes (principle surface electrodes) 551 and the adjustment electrodes (principle surface electrodes) 552 are electrically connected to each other via wires (not shown) to have mutually the same potential. Also, the adjustment electrodes (principle surface electrodes) 553 and the adjustment electrodes (principle surface electrodes) 554 are electrically connected to each other to have mutually the same potential. The adjustment electrodes 551 and 552 are electrically connected through wires (not shown), together with the detection electrodes 532 and 533 described above, to the terminal 57e provided at the support part 25 shown in FIG. 3. Also, the adjustment electrodes 553 and 554 are electrically connected through wires (not shown), together with the detection electrodes 531 and 534 described above, to the terminal 57c provided at the support part 25 shown in FIG. 3. Note that the adjustment electrode group 56 is electrically connected through wires (not shown), together with the detection electrode group 54, to the terminals 57d and 57f provided at the support part 25 shown in FIG. 3.

The adjustment electrode group 58 is formed from, as shown in FIGS. 7A and 7B, adjustment electrodes 581 (referred to as second adjustment electrodes or second electrodes) provided on the top surface of the adjustment vibration arm 243, adjustment electrodes 582 (referred to as second adjustment electrodes or second electrodes) provided on the lower surface of the adjustment vibration arm 243, adjustment electrodes 583 (referred to as second adjustment electrodes or second electrodes) provided on one of the side surfaces (on the left side in FIG. 7) of the adjustment vibration arm 243, and adjustment electrodes 584 (referred to as second adjustment electrodes or second electrodes) provided on the other of the side surfaces (on the right side in FIG. 7) of the adjustment vibration arm 243.

The adjustment electrodes (principle surface electrodes) 581 and the adjustment electrodes (principle surface electrodes) 582 are formed in a manner to overlap each other as viewed in a plan view. In other words, the adjustment electrodes 581 and the adjustment electrodes 582 are formed such that their outer shapes coincide with each other as viewed in a plan view. By the adjustment electrodes 581 and the adjustment electrodes 582 thus formed, when branch parts 91 of the adjustment electrodes 581 are cut, as described below, branch parts (not shown) of the adjustment electrodes 582 corresponding to the cut branch parts 91 can also be cut at the same time. The adjustment electrodes 551-554 and the adjustment electrodes 581-584 are electrically connected to the detection electrodes 531-534 in a manner to have mutually reversed polarities.

More specifically, the adjustment electrodes (principle surface electrodes) 581 and the adjustment electrodes (principle surface electrodes) 582 are electrically connected to each other via wires (not shown) to have mutually the same potential. Also, the adjustment electrodes (principle surface electrodes) 583 and the adjustment electrodes (principle surface electrodes) 584 are electrically connected to each other to have mutually the same potential. The adjustment electrodes 581 and 582 are electrically connected through wires (not shown), together with the detection electrodes 531 and 534 described above, to the terminal 57c provided at the support part 25 shown in FIG. 3. Also, the adjustment electrodes 583 and 584 are electrically connected through wires (not shown), together with the detection electrodes 532 and 533 described above, to the terminal 57e provided at the support part 25 shown in FIG. 3. Note that the adjustment electrode group 56 is electrically connected through wires (not shown), together with the detection electrode group 54, to the terminals 57d and 57f provided at the support part 25 shown in FIG. 3.

In accordance with the present embodiment, as described below, for the adjustment vibration arm 241 and the adjustment vibration arm 242 to vibrate mutually in the same phase, the adjustment electrodes (the first electrodes) 551 and 552 of the adjustment vibration arm 241 and the adjustment electrodes (the second electrodes) 583 and 584 of the adjustment vibration arm 242 are connected to each other, and the adjustment electrodes (the second electrodes) 553 and 554 of the adjustment vibration arm 241 and the adjustment electrodes (the first electrodes) 581 and 582 of the adjustment vibration arm 242 are connected to each other, as described above.

If the adjustment vibration arm 241 and the adjustment vibration arm 242 are to vibrate in mutually reverse phases, the adjustment electrodes (the first electrodes) 551 and 552 of the adjustment vibration arm 241 and the adjustment electrodes (the first electrodes) 581 and 582 of the adjustment vibration arm 242 may be connected to each other, and the adjustment electrodes (the second electrodes) 553 and 554 of the adjustment vibration arm 241 and the adjustment electrodes (the second electrodes) 583 and 584 of the adjustment vibration arm 242 may be connected to each other.

As shown in FIG. 8, the sensor element 2 having such adjustment electrodes 581-584 can output a value from the terminal 57c as a sensor output of which the amount of charge generated at the detection electrodes 531 and 534 and the amount of charge generated at the adjustment electrodes 551 and 552 and the adjustment electrodes 583 and 584 are added together, and outputs a value from the terminal 57e a sensor output of which the amount of charge generated at the detection electrodes 532 and 533 and the amount of charge generated at the adjustment electrodes 581 and 582 and the adjustment electrodes 553 and 554 are added together.

The adjustment electrodes 551 and 552 and the adjustment electrodes 583 and 584 are connected in mutually reverse polarities, such that the charges generated are mutually cancelled out. Also, the adjustment electrodes 553 and 554 and the adjustment electrodes 581 and 582 are connected in mutually reverse polarities, such that the charges generated are mutually cancelled out.

By removing a part or the entirety of the adjustment electrodes 551 and 552, the amount of charge to be generated at the adjustment electrodes 551 and 552 and the adjustment electrodes 553 and 554 can be made smaller. This creates a difference between the amount of charge generated at the adjustment electrodes 551 and 552 and the adjustment electrodes 553 and 554 and the amount of charge generated at the adjustment electrodes 581 and 582 and the adjustment electrodes 583 and 584. The amount of charge difference is provided as a signal for adjusting the sensor output (an adjusting signal). Note that the polarity of the adjusting signal to be outputted here becomes to be the polarity of the adjustment electrodes 581 and 582 and the adjustment electrodes 583 and 584.

By removing a part or the entirety of the adjustment electrodes 581 and 582, the amount of charge to be generated at the adjustment electrodes 581 and 582 and the adjustment electrodes 583 and 584 can be made smaller. This creates a difference between the amount of charge generated at the adjustment electrodes 581 and 582 and the adjustment electrodes 583 and 584 and the amount of charge generated at the adjustment electrodes 551 and 552 and the adjustment electrodes 553 and 554. The amount of charge difference is provided as a signal for adjusting the sensor output (an adjusting signal). Note that the polarity of the adjusting signal to be outputted here becomes to be the polarity of the adjustment electrodes 551 and 552 and the adjustment electrodes 553 and 554.

More specifically, for example, the sensor output may be adjusted (corrected) such that the sensor output in the state in which no physical quantity is applied to the sensor element 2 (hereafter also referred to as the "zero point output") becomes zero. In particular, the adjustment electrodes 551-554 and the adjustment electrodes 581-584 are electrically connected to the detection electrodes 531-534 in a manner to have mutually reverse polarities. Therefore, in either of the cases where the sensor output in the state in which no physical quantity is applied to the sensor element 2 is larger or smaller than a desired reference value, the sensor output in the state in which no physical quantity is applied to the sensor element 2 can be adjusted to the desired reference value, through selecting any of the adjustment electrodes 551 and 552 and the adjustment electrodes 581 and 582 and removing a portion or the entirety of the selected adjustment electrode.

Next, the adjustment electrode 551 will be described in detail. It is noted that description of the adjustment electrodes 552, 581 and 582 will be omitted as they are generally the same as the adjustment electrode 551. As shown in FIG. 6A, the adjustment electrode 551 is equipped with a common part 60 and a plurality of branch parts 61. The common part 60 is electrically connected to the detection electrodes 531 and 534 described above.

The plural branch parts 61 branch out from the common part 60 and are arranged side by side along the extension direction of the adjustment vibration arm 241. Accordingly, at least one of the branch parts 61 among the plural branch parts 61 on the adjustment electrodes 551 and 552 or the common part 60 may be cut midway, such that the amount of charge to be generated at the adjustment electrodes 551 and 552 and the adjustment electrodes 553 and 554 can be reduced, whereby the sensor output can be adjusted.

In particular, the plurality of branch parts 61 branch out from the common part 60, such that, even when any arbitrary one of the branch parts 61 is cut, the remaining portion of the branch parts 61 can maintain their electrically connected state with the common part 60. In other words, the electrode area of the adjustment electrode 515 can be reduced by the amount of the arbitrary one of the branch parts 61 cut off among the plural branch parts 61. Further, the plural branch parts 61 are arranged side by side along the extension direction of the adjustment vibration arm 241, such that the sensor output can be readily and highly accurately adjusted according to the position and the number of the branch parts 61 to be cut.

In accordance with the present embodiment, the common part 60 extends in the extension direction of the adjustment vibration arm 241, and the plural branch parts 61 branch out at mutually different multiple locations in the length direction of the common part 60. Accordingly, the structure of the adjustment electrodes 551 can be simplified. In the present embodiment, as shown in FIG. 6A, the common part 60 is eccentrically located to one side in the width direction of the adjustment vibration arm 241 as viewed in a plan view (as viewed in the z-axis direction). Also, the common part 60 is formed to have a narrow width, such that the common part 60 can be relatively readily cut midway.

Also, each of the plural branch parts 61 has a narrow part 62 having a narrow width formed on the side of the common part 60, and a wide part 63 having a greater width on the opposite side of the common part 60. As each of the plural branch parts 61 has the narrow part 62 and the wide part 63, the adjustment electrode 551 can secure a large electrode area before adjustment (before the common part 60 or the branch parts 61 are cut midway), a large adjustment range can be secured for adjusting the sensor output through cutting the common part 60 or the branch parts 61 midway. Also, mid portions of the branch parts 61 can be relatively, readily cut, as each of the branch parts 61 has the narrow part 62.

Also, the plural narrow parts 62 are provided in parallel with one another. Also, each of the plural narrow parts 62 extends in a direction orthogonal to the extension direction of the adjustment vibration arm 241, in other words, extends in the x-axis direction. Also, the plural branch parts 61 are formed to have mutually the same dimensions. Also, the plural branch parts 61 are arranged at equal pitches in the extension direction of the adjustment vibration arm 241, in other words, in the y-axis direction.

When a drive signal is applied between the terminal 57a and the terminal 57b in the sensor element 2 thus configured, as shown in FIG. 9, the drive vibration arm 221 and the drive vibration arm 222 flexurally vibrate (driving-vibrate) in a manner to move closer to or separated from each other. More specifically, a state in which the drive vibration arm 221 flexes in a direction indicated by an arrow A1 shown in FIG. 9 and the drive vibration arm 222 flexes in a direction indicated by an arrow A2 shown in FIG. 9, and a state in which the drive vibration arm 221 flexes in a direction indicated by an arrow B1 shown in FIG. 9 and the drive vibration arm 222 flexes in a direction indicated by an arrow B2 shown in FIG. 9 are alternately repeated.

When an angular velocity ω about the y-axis is applied to the sensor element 2 in a state in which the drive vibration arms 221 and 222 are driven and vibrated, the drive vibration arms 221 and 222 flexurally vibrate in mutually opposite sides in the z-axis direction by Coriolis force. Due to this flexural vibration, the detection vibration arms 231 and 232 flexurally vibrate (detection-vibrate) in mutually opposite sides in the z-axis direction. More specifically, a state in which the detection vibration arm 231 flexes in a direction indicated by an arrow C1 shown in FIG. 9 and the detection vibration arm 232 flexes in a direction indicated by an arrow C2 shown in FIG. 9, and a state in which the detection vibration arm 231 flexes in a direction indicated by an arrow D1 shown in FIG. 9 and the detection vibration arm 232 flexes in a direction indicated by an arrow D2 shown in FIG. 9 are alternately repeated. By detecting charges generated at the detection electrode groups 53 and 54 due to detection vibration of the detection vibration arms 231 and 232, the angular velocity ω worked on the sensor element 2 can be obtained.

At this moment, the adjustment vibration arms 241 and 242 also flexurally vibrate, accompanying to the driving-vibration of the drive vibration arms 221 and 222, in mutually closing or separating directions. Similarly, the adjustment vibration arms 243 and 244 flexurally vibrate, accompanying to the driving-vibration of the drive vibration arms 221 and 222, in mutually closing or separating directions. Also, in accordance with the present embodiment, a state in which the adjustment vibration arm 241 and the adjustment vibration arm 242 flex in mutually approximating directions, and the adjustment vibration arm 243 and the adjustment vibration arm 244 flex in mutually approximating directions, and a state in which the adjustment vibration arm 241 and the adjustment vibration arm 242 flex in mutually separating directions, and the adjustment vibration arm 243 and the adjustment vibration arm 244 flex in mutually separating directions are alternately repeated.

In the sensor element 2, when the drive vibration arms 221 and 222 each do not have a cross-sectional shape as designed due to, for example, manufacturing variations, a charge is generated at the detection electrodes 531 and 534 and the detection electrodes 532 and 533 as a leakage output S, as shown in FIG. 10A, in the state in which the drive vibration arms 221 and 224 are vibrated by excitation without applying a physical quantity to the sensor element 2.

Also, in the sensor element 2, regardless whether or not a physical quantity is applied to the sensor element 2, a charge is generated at the adjustment electrodes 551 and 552 and the adjustment electrodes 553 and 554 as an adjustment output T1, and a charge is generated at the adjustment electrodes 581 and 582 and the adjustment electrodes 583 and 584 as an adjustment output T2, accompanying to driving-vibration of the drive vibration arms 221 and 223, as shown in FIG. 10B.

The adjustment output T1 and the adjustment output T2 are in mutually reverse polarities (reverse phases). Also, the sum T1+T2 of the adjustment output T1 and the adjustment output T2 cancels out the leakage output S, whereby the zero point output of the sensor element 2 can be adjusted to zero. In other words, the summed charge of the charge provided from the adjustment electrodes 551-554 and the charge provided from the adjustment electrodes 581-584 has a reverse polarity with respect to the charge generated from the detection electrodes 231 and 232 when a physical quantity is not applied to the drive vibration arms 221 and 222.

Accordingly, the sensor output is adjusted by removing a portion or the entirety of the adjustment electrodes 551 and 552 or the adjustment electrodes 581 and 582 such that the sum T1+T2 of the adjustment output T1 and the adjustment output T2 cancels out the leakage output S. In other words, the method for manufacturing the sensor element 2 includes a charge adjustment step of adjusting the amount of charge generated at the adjustment electrodes 551-554 or the adjustment electrodes 581-584 by removing a portion or the entirety of the adjustment electrodes 551 and 552 or the adjustment electrodes 581 and 582.

Figure 11:
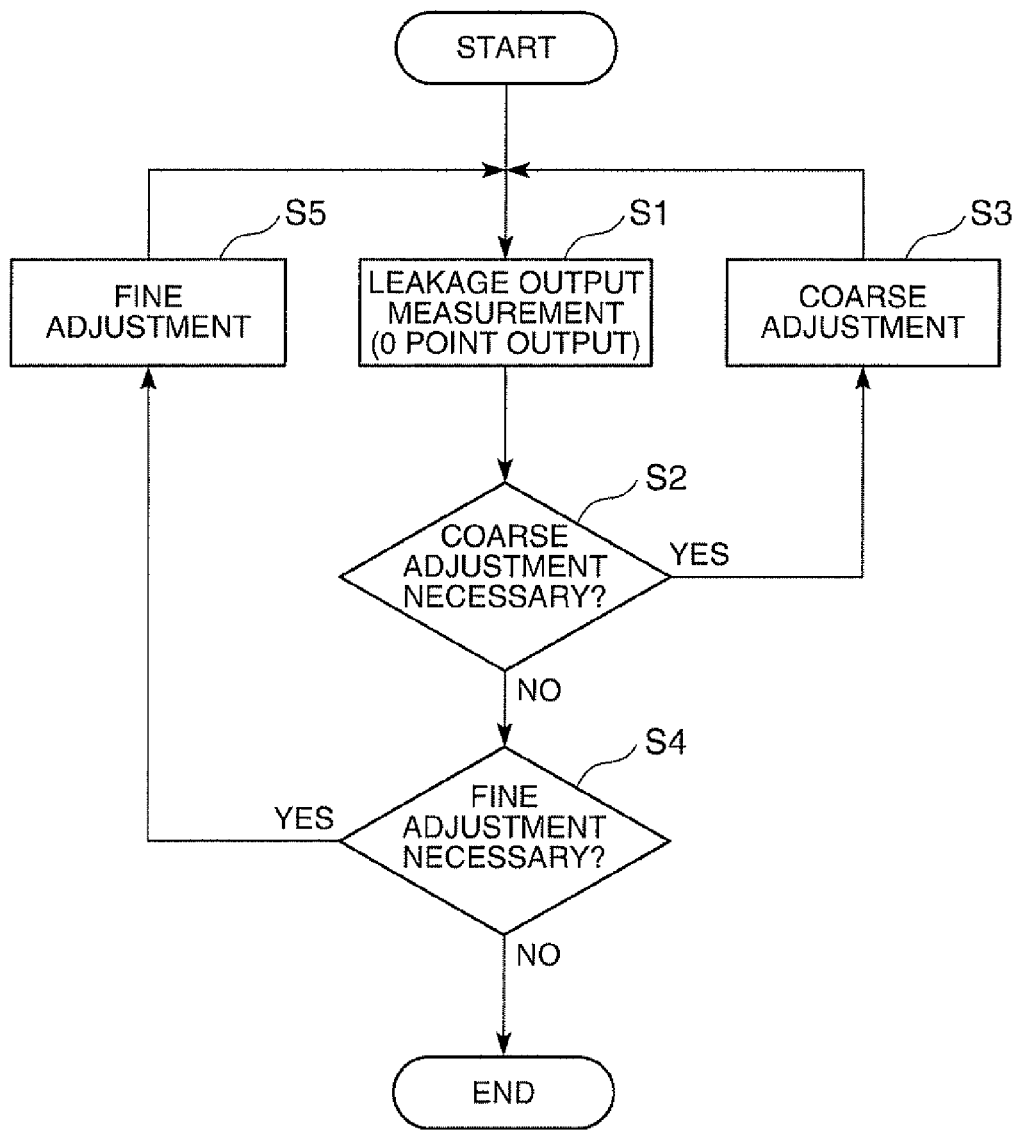
FIG. 11 is a flow chart showing an example of a characteristic adjustment method for the sensor element in accordance with an aspect of the invention.

Here, the charge adjustment step (a method for adjusting the characteristic of the sensor element 2) will be described with reference to a specific example. Note that, although the characteristic adjustment will be described below for the detection vibration arm 231 and the adjustment vibration arms 241 and 243 as representative, the characteristic adjustment is similarly applicable to the detection vibration arm 232 and the adjustment vibration arms 242 and 244. FIG. 11 is a flow chart showing an example of the method for adjusting the characteristic of a sensor element in accordance with an aspect of the invention, and FIG. 12 is a diagram for describing an example of the method for adjusting the characteristic of the sensor element in accordance with an aspect of the invention.

According to the method for adjusting the characteristic of the sensor element 2, the sensor element 2 described above is prepared, and the characteristic of the sensor element 2 is adjusted by removing a portion or the entirety of the adjustment electrodes 551 and 552 or the adjustment electrodes 581 and 582. As described above, when the leakage output S is generated as indicated in FIG. 10A, and the adjustment outputs T1 and T2 are generated as indicated in FIG. 10B, the adjustment electrodes 551 and 552 are selected from among the adjustment electrodes 551 and 552 and the adjustment electrodes 581 and 582, and a portion of the selected adjustment electrodes is removed to adjust the characteristic of the sensor element 2.

It is noted that, when the leakage output S has a reverse polarity (a reverse phase) with respect to the one shown in FIG. 10A, the adjustment electrodes 581 and 582 would be selected and a portion thereof removed, thereby adjusting the characteristic of the sensor element 2. Whether the adjustment electrodes 551 and 552 should be selected or the adjustment electrodes 581 and 582 should be selected as the adjustment electrodes whose portion is to be removed may be judged based on the result of measurement in step S1 to be described below.

As below, a specific example in which the leakage output S is generated as indicated in FIG. 10A as described above and the adjustment outputs T1 and T2 are generated as indicated in FIG. 10B will be described as representative. In this case, for example, by cutting at least one of the branch parts 61 among the plural branch parts 61 of the adjustment electrode 551 or the common part 60 midway, the characteristic of the sensor element 2 is adjusted. By the method for adjusting the characteristic of the sensor element 2, excellent detection sensitivity can be readily and securely exhibited. Note that, as for the adjustment electrode 552, a portion thereof is removed in a similar manner as performed on the adjustment electrode 551.

For the characteristic adjustment, the amount of charge outputted from the terminals 57c and 57e is measured in a state in which the drive vibration arms 221 and 222 are vibrated by energization, and the cutting is performed based on the measurement result. By this method, excellent detection sensitivity can be readily and securely exhibited. More specifically, as shown in FIG. 11, first, a leakage output (a zero point output) is measured (step S1).

Figures 12A, 12B, 12C:
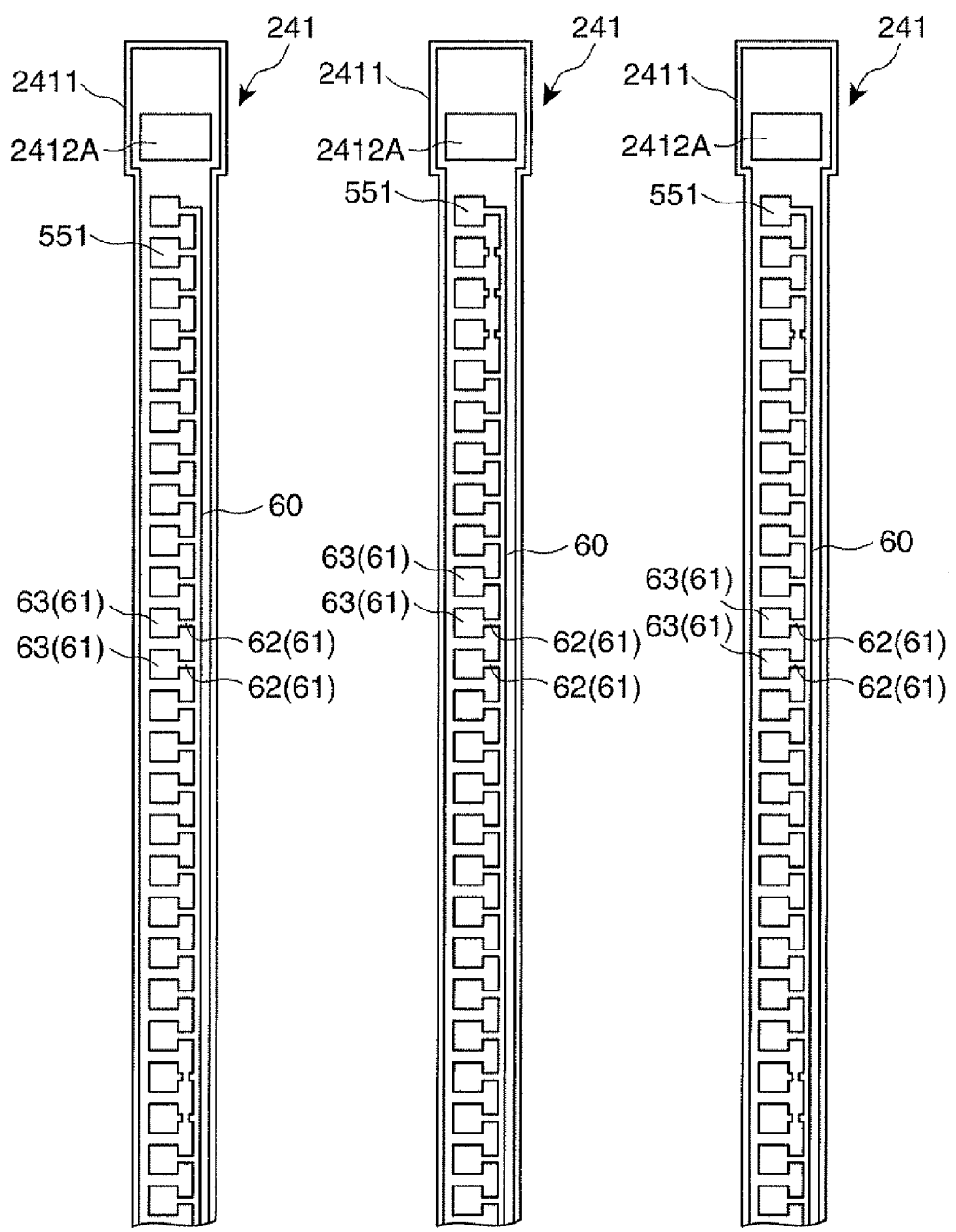
FIGS. 12A, 12B and 12C are diagrams for describing an example of the characteristic adjustment method for the sensor element in accordance with an aspect of the invention.

Based on the measurement result, whether coarse adjustment is necessary or not is judged (step S2). More specifically, when the zero point output is at a first set value (for example, about 100 pA) or greater, it is judged that coarse adjustment is necessary, and when the zero point output is less than the first set value, it is judged that coarse adjustment is not necessary. When it is judged that coarse adjustment is necessary, coarse adjustment is performed (step S3). More specifically, for example, as shown in FIG. 12A, among the plural branch parts 61 of the adjustment electrode 551, a necessary number of the branch parts 61 located on the side of the base of the adjustment vibration arm 241 is cut.

Here, the amount of reduction in the adjustment output T resulting from cutting each of the branch parts 61 may be obtained in advance by experiment and/or calculation, whereby the number and the position of the branch parts 61 to be cut can be appropriately selected based on the zero point output measured in step S1. Also, the branch parts 61 may be cut by any appropriate method without any particular limitation, and may be cut by, for example, using a laser beam.

When it is judged that coarse adjustment is necessary, a part or the entirety of the mass adjustment films 2412 and 2432 may be removed according to the necessity, thereby adjusting the resonance frequency of each of the adjustment vibration arms 241 and 243. More specifically, depending on the necessity, before conducting the charge adjustment step, the step of measuring charges generated at the detection electrodes 531-534 in the state in which the drive vibration arms 221 and 222 are vibrated by energization, and the step of adjusting the resonance frequency of at least one adjustment vibration arm among the adjustment vibration arms 241-244 based on the measurement result may be conducted. Accordingly, the range of adjusting the sensor output can be made wider. Note that FIG. 12A shows a mass adjusting film 2412A formed by removing a part of the mass adjustment film 2412.

A part or the entirety of the mass adjustment films 2412 and 2432 may be removed by any appropriate method without any particular limitation, and may be removed by, for example, using a laser beam. After the coarse adjustment, the process returns to step S1 again to measure the leakage output (zero point output). Then, measurement of the zero point output and coarse adjustment are alternately repeated until the zero point output becomes less than the first set value.

On the other hand, when it is judged that coarse adjustment is not necessary, a judgment is made as to whether or not fine adjustment is necessary (step S4). More specifically, when the zero point output is at a second set value that is smaller than the first set value (for example, about 10 pA) or greater, it may be judged that fine adjustment is necessary, and when the zero point output is less than the second set value, it may be judged that fine adjustment is not necessary.

When it is judged that fine adjustment is necessary, fine adjustment is conducted (step S5). More specifically, for example, as shown in FIG. 12B or FIG. 12C, among the plural branch parts 61 of the adjustment electrode 551, a necessary number of the branch parts 61 located on the side of the tip of the adjustment vibration arm 241 are cut. It is noted that FIG. 12B illustrates a case where fine adjustment is conducted without conducting coarse adjustment, and FIG. 12C illustrates a case where fine adjustment is conducted after conducting coarse adjustment. Also, FIGS. 12B and 12C illustrate a case where the narrow portions 62 of the branch parts 61 are cut. However, the common part 60 may be cut midway, whereby the electrode area of the adjustment electrode 551 can be reduced by a plurality of the branch portions together at once by one cutting operation.

Here, similar to the coarse adjustment, the amount of reduction in the adjustment output T resulting from cutting each of the branch parts 61 may be obtained in advance by experiment and/or calculation, whereby the number and the position of the branch parts 61 to be cut can be appropriately selected based on the zero point output measured in step S1. After the fine adjustment, the process returns to step S1 again, to measure the leakage output (zero point output). Then, measurement of the zero point output and fine adjustment are alternately repeated until the zero point output becomes less than the second set value. On the other hand, when it is judged that fine adjustment is not necessary, adjustment of the characteristic of the sensor element 2 is completed. According to the method of adjusting the characteristic of the sensor element 2 described above, the coarse adjustment and the fine adjustment described above can be arbitrarily selected and conducted according to the necessity, such that excellent detection sensitivity can be readily and securely exhibited.

IC Chip 3

An IC chip 3 shown in FIG. 1 and FIG. 2 is an electronic component having a function to drive the sensor element 2 described above, and a function to detect an output (a sensor output) from the sensor element 2. The IC chip 3 is equipped with, although not shown, a drive circuit that drives the sensor element 2, and a detection circuit that detects an output from the sensor element 2. Also, the IC chip 3 is provided with a plurality of connection terminals 31.

Package 4

A package 4, as shown in FIG. 1 and FIG. 2, is equipped with a base member 41 (a base) having a recessed portion that opens upward, and a lid member 42 (a lid) that covers the recessed portion of the base member 41. Accordingly, an inner space is formed between the base member 41 and the lid member 42 where the sensor element 2 and the IC chip 3 are housed.

The base member 41 is formed from a flat plate body 411 (a plate part), and a frame body 412 (a frame part) that is bonded to an upper surface of the plate body 411 at an outer peripheral portion thereof. The base member 41 may be composed of, for example, aluminum oxide sintered compact, crystal, glass or the like. As shown in FIG. 1, the support part 25 of the sensor element 2 described above is bonded to the upper surface of the base member 41 (the surface on the side thereof covered by the lid member 42) by a bonding member 81 such as adhesive composed of, for example, epoxy resin, acrylic resin or the like. By this structure, the sensor element 2 is supported on and affixed to the base member 41.

Also, the IC chip 3 described above is bonded to the upper surface of the base member 41 by a bonding member 82, such as, adhesive composed of, for example, epoxy resin, acrylic resin or the like. By this structure, the IC chip 3 is supported on and affixed to the base member 41. Furthermore, as shown in FIG. 1 and FIG. 2, a plurality of internal terminals 71 and a plurality of internal terminals 72 are provided on the upper surface of the base member 41.

The plural internal terminals 71 are electrically connected to the terminals 57a-57f of the sensor element 2 described above via wires comprised of, for example, bonding wires. The plural internal terminals 71 are electrically connected to the plural internal terminals 72 via wires (not shown). Also, the plural internal terminals 72 are electrically connected to the plural connecting terminals 31 of the IC chip 3 described above via wires comprised of, for example, bonding wires.

On the other hand, as shown in FIG. 1, the lower surface of the base member 41 (i.e., the bottom surface of the package 4) is provided with a plurality of external terminals 73 that are used when the package 4 is mounted on an apparatus (an external apparatus) in which the sensor device 1 is installed. The plural external terminals 73 are electrically connected to the internal terminals 72 described above via internal wires (not shown). By this, the IC chip 3 and the plural external terminals 73 are electrically connected to one another.

The internal terminals 71 and 72 and the external terminals 73 are each comprised of, for example, a metalized layer of tungsten (W) or the like, and a metal membrane of laminated films of nickel (Ni), gold (Au) and the like that may be plated thereon. The lid member 42 is bonded air-tightly to the base member 41. Accordingly, the inner space of the package 4 is air-tightly sealed.

The lid member 42 may be formed from, for example, the same material as that of the base member 41, or made of metal, such as, Kovar, 42 Alloy, stainless steel or the like. The base member 41 and the lid member 42 may be bonded together by an appropriate method without any particular limitation, and may be bonded together by a bonding method using a brazing material, an adhesive composed of setting type resin or the like, or a welding method such as a seam welding, a laser welding or the like.

Such bonding may be conducted in a reduced pressure atmosphere or an inert gas atmosphere, such that the internal space of the package 4 can be maintained in a reduced pressure state or an inert gas-filled state. By the sensor element 2 implemented in the sensor device 1 in accordance with the first embodiment described above, excellent detection sensitivity can be readily and securely exhibited. Also, the sensor device 1 equipped with the sensor element 2 described above can provide excellent detection sensitivity at low cost.

Second Embodiment

Figures 13A, 13B:
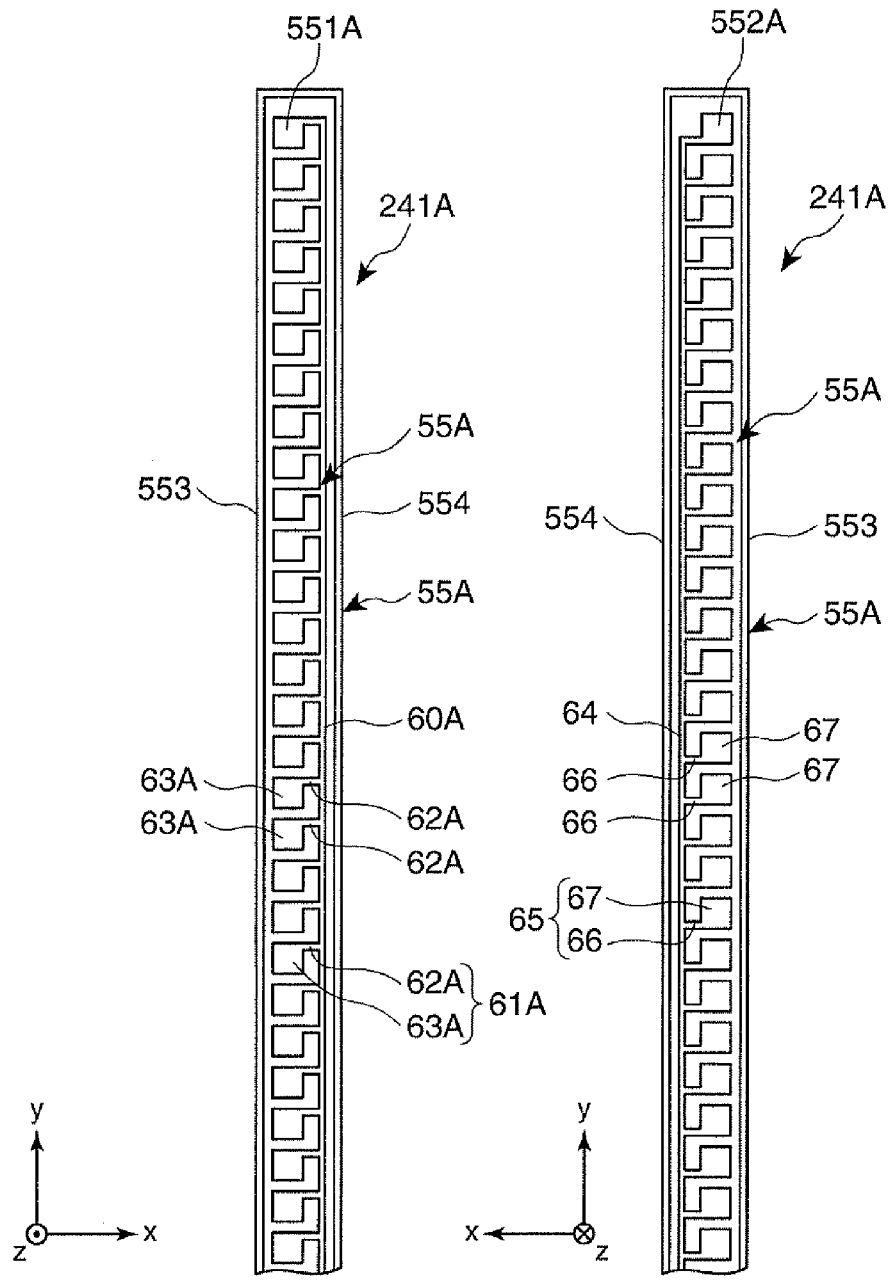
FIGS. 13A and 13B are enlarged plan views showing adjustment vibration arms of a sensor element in accordance with a second embodiment of the invention.

Next, a second embodiment of the invention will be described. FIGS. 13A and 13B are enlarged plan views showing adjustment vibration arms of a sensor element in accordance with the second embodiment. The sensor element in accordance with the second embodiment is similar to the sensor element in accordance with the first embodiment described above, except that the wide parts at the tips of the first adjustment vibration arm and the second adjustment vibration arm and the mass adjusting films are omitted, and the first adjustment electrode and the second adjustment electrode have different shapes.

Note that, in the following description of the sensor element of the second embodiment, aspects different from the embodiment described above will be mainly described and description of similar aspects will be omitted. Also, in FIGS. 13A and 13B, the same signs are assigned to the same configurations as those of the embodiment described above. The sensor element in accordance with the second embodiment has an adjustment vibration arm 241A (a first adjustment vibration arm) as shown in FIGS. 13A and 13B. Although not shown, similar to the first embodiment described above, the sensor element in accordance with the second embodiment includes a base part, a pair of drive vibration arms and a pair of detection vibration arms. Also, a first adjustment vibration arm paring with the adjustment vibration arm 241A, and a pair of second adjustment vibration arms configured similarly to the pair of first adjustment vibration arms extend from the base part.

An adjustment electrode group 55A is provided on the adjustment vibration arm 241A. The adjustment electrode group 55A is formed from an adjustment electrode 551A provided on the upper surface of the adjustment vibration arm 241A, an adjustment electrode 552A provided on the lower surface of the adjustment vibration arm 241A, an adjustment electrode 553 provided on one of the side surfaces of the adjustment vibration arm 241A, and an adjustment electrode 554 provided on the other of the side surfaces of the adjustment vibration arm 241A.

The adjustment electrode 551A is equipped with a common part 60A and a plurality of branch parts 61A. Each of the branch parts 61A has a narrow part 62A formed in a narrow width on the side of the common part 60A, and a wide part 63A formed in a wider width on the opposite side of the common part 60A. Similarly, the adjustment electrode 552A is equipped with a common part 64 and a plurality of branch parts 65. Each of the branch parts 65 has a narrow part 66 formed in a narrow width on the side of the common part 64, and a wide part 67 formed in a wider width on the opposite side of the common part 64.

The adjustment electrodes 551A and 552A have portions in which the branch parts 61A and the branch parts 65 do not overlap one another as viewed in a plan view. More specifically, the narrow parts 62A and the narrow parts 66 are formed in a manner not to overlap each other, as viewed in a plan view. By this structure, although the adjustment electrode 551A and the adjustment electrode 552A face each other through the adjustment vibration arm 241A, the branch parts 61A of the adjustment electrode 551A, and the branch parts 65 of the adjustment electrode 552A can be cut independently from one another by using a laser beam. Accordingly, the sensor output can be adjusted with higher accuracy. By the sensor element in accordance with the second embodiment described above, excellent detection sensitivity can also be readily and securely exhibited.

Third Embodiment

Figure 14:
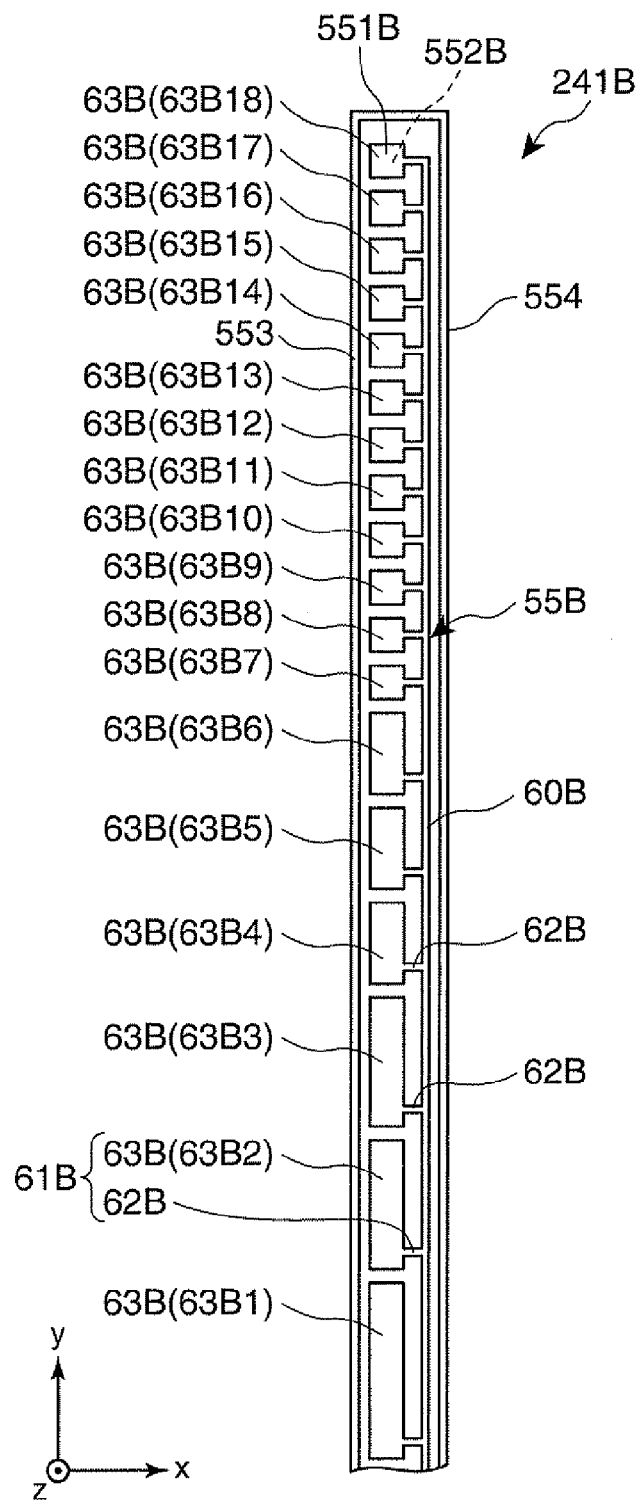
FIG. 14 is an enlarged plan view showing an adjustment vibration arm of a sensor element in accordance with a third embodiment of the invention.

Next, a third embodiment of the invention will be described. FIG. 14 is an enlarged plan view showing an adjustment vibration arm of a sensor element in accordance with the third embodiment. The sensor element in accordance with the third embodiment is similar to the sensor element in accordance with the first embodiment described above, except that the wide parts at the tips of the first adjustment vibration arm and the second adjustment vibration arm and the mass adjusting films are omitted, and the first adjustment electrode and the second adjustment electrode have different shapes.

Note that, in the following description of the sensor element of the third embodiment, aspects different from the embodiments described above will be mainly described and description of similar aspects will be omitted. Also, in FIG. 14, the same signs are assigned to the same configurations as those of the embodiments described above. The sensor element in accordance with the third embodiment has an adjustment vibration arm 241B (a first adjustment vibration arm) as shown in FIG. 14. Although not shown, similar to the first embodiment described above, the sensor element in accordance with the third embodiment includes a base part, a pair of drive vibration arms and a pair of detection vibration arms. Also, a first adjustment vibration arm paring with the adjustment vibration arm 241B, and a pair of second adjustment vibration arms configured similarly to the pair of first adjustment vibration arms extend from the base part.

An adjustment electrode group 55B is provided on the adjustment vibration arm 241B. The adjustment electrode group 55B is formed from an adjustment electrode 551B provided on the upper surface of the adjustment vibration arm 241B, an adjustment electrode 552B provided on the lower surface of the adjustment vibration arm 241B, an adjustment electrode 553 provided on one of the side surfaces of the adjustment vibration arm 241B, and an adjustment electrode 554 provided on the other of the side surfaces of the adjustment vibration arm 241B.

The adjustment electrode 551B will be described below in detail. Note that the adjustment electrode 552B is similar to the adjustment electrode 551B. The adjustment electrode 551B is equipped with a common part 60B and a plurality of branch parts 61B. Each of the branch parts 61B has a narrow part 62B formed in a narrow width on the side of the common part 60B, and a wide part 63B formed in a wider width on the opposite side of the common part 60B.

The plural wide parts 63B include wide parts 63B1-63B6 provided on the side of the base end of the adjustment vibration arm 241B, and a plurality of wide parts 63B7-63B18 provided on the side of the tip end of the adjustment vibration arm 241B. The wide parts 63B1-63B18 are arranged from the base end side to the tip end side of the adjustment vibration arm 241B in the order of the wide part 63B1, the wide part 63B2, the wide part 63B3, the wide part 63B4, the wide part 63B5, the wide part 63B6, . . . , and the wide part 63B18.

The width of each of the wide parts 63B1-63B6 is greater than the width of each of the wide parts 63B7-63B18 in the y-axis direction. Accordingly, the area (electrode area) in a plan view of each of the wide parts 63B1-63B6 is greater than the area (electrode area) of each of the wide parts 63B7-63B18 as viewed in a plan view. Therefore, the amount of reduction in the adjustment output (in other words, the amount of adjustment in coarse adjustment) by cutting the branch part 61B having each of the wide parts 63B1-63B6 can be made greater. Also, the amount of reduction in the adjustment output (in other words, the amount of adjustment in fine adjustment) by cutting the branch part 61B having each of the wide parts 63B7-63B18 can be made smaller. By the sensor element in accordance with the third embodiment described above, excellent detection sensitivity can also be readily and securely exhibited.

Fourth Embodiment

Figure 15:
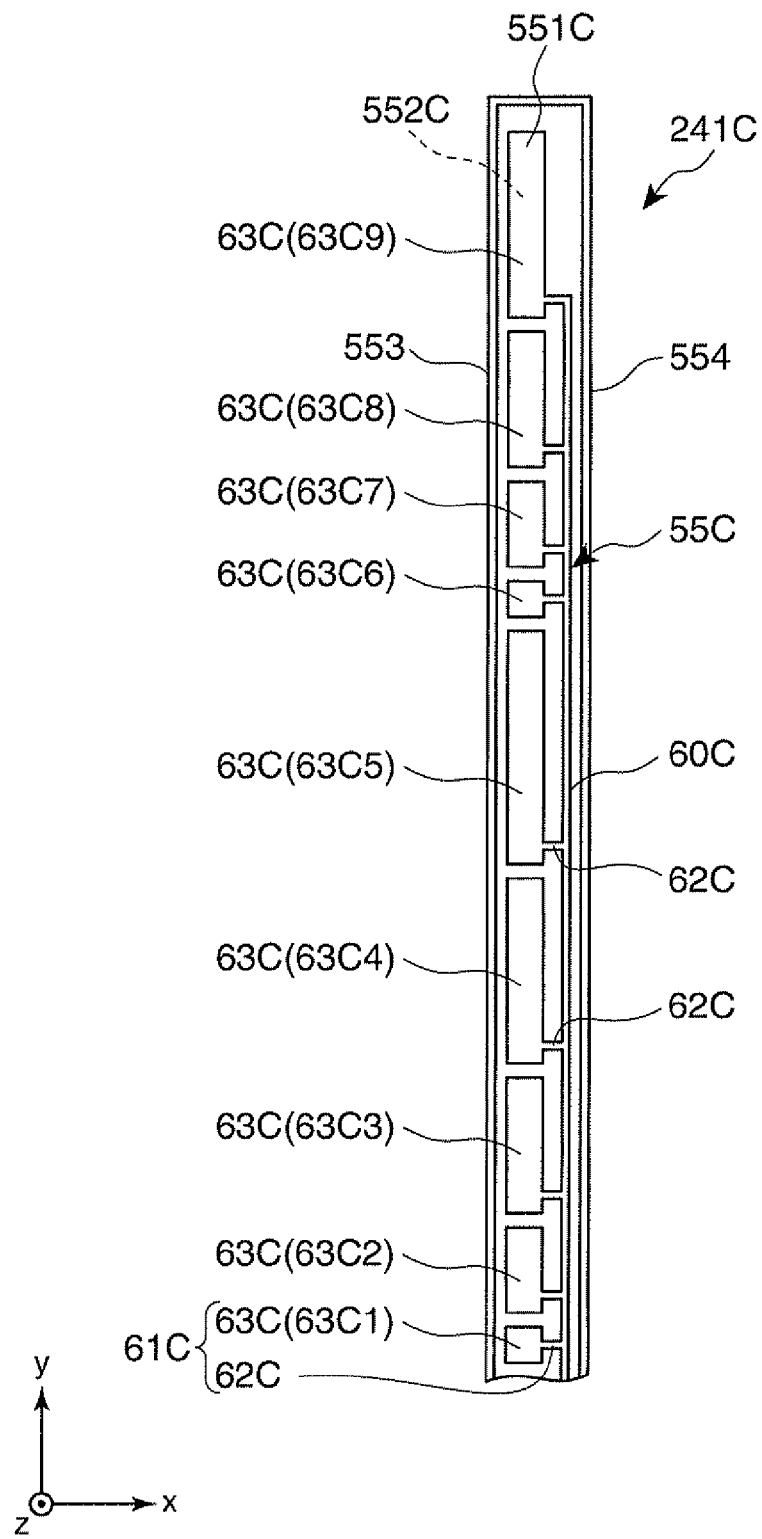
FIG. 15 is an enlarged plan view showing an adjustment vibration arm of a sensor element in accordance with a fourth embodiment of the invention.

Next, a fourth embodiment of the invention will be described. FIG. 15 is an enlarged plan view showing an adjustment vibration arm of a sensor element in accordance with the fourth embodiment. The sensor element in accordance with the fourth embodiment is similar to the sensor element in accordance with the first embodiment described above, except that the wide parts at the tips of the first adjustment vibration arm and the second adjustment vibration arm and the mass adjusting films are omitted, and the first adjustment electrode and the second adjustment electrode have different shapes.

Note that, in the following description of the sensor element of the fourth embodiment, aspects different from the embodiments described above will be mainly described and description of similar aspects will be omitted. Also, in FIG. 15, the same signs are assigned to the same configurations as those of the embodiments described above.

The sensor element in accordance with the fourth embodiment has an adjustment vibration arm 241C (a first adjustment vibration arm) as shown in FIG. 15. Although not shown, similar to the first embodiment described above, the sensor element in accordance with the fourth embodiment includes a base part, a pair of drive vibration arms and a pair of detection vibration arms. Also, a first adjustment vibration arm paring with the adjustment vibration arm 241C, and a pair of second adjustment vibration arms configured similarly to the pair of first adjustment vibration arms extend from the base part.

An adjustment electrode group 55C is provided on the adjustment vibration arm 241C. The adjustment electrode group 55C is formed from an adjustment electrode 551C provided on the upper surface of the adjustment vibration arm 241C, an adjustment electrode 552C provided on the lower surface of the adjustment vibration arm 241C, an adjustment electrode 553 provided on one of the side surfaces of the adjustment vibration arm 241C, and an adjustment electrode 554 provided on the other of the side surfaces of the adjustment vibration arm 241C.

The adjustment electrode 551C will be described below in detail. Note that the adjustment electrode 552C is similar to the adjustment electrode 551C. The adjustment electrode 551C is equipped with a common part 60C and a plurality of branch parts 61C. Each of the branch parts 61C has a narrow part 62C formed in a narrow width on the side of the common part 60C, and a wide part 63C formed in a wider width on the opposite side of the common part 60C.

The plural wide parts 63C include wide parts 63C1-63C5 provided on the side of the base end of the adjustment vibration arm 241C, and a plurality of wide parts 63C6-63C9 provided on the side of the tip end of the adjustment vibration arm 241C. In the wide parts 63C1-63C5, among two adjacent ones of the wide parts 63C, one of the wide parts 63C on the tip end side of the adjustment vibration arm 241C in the y-axis direction is greater in width than the other wide part 63C on the base end side in the y-axis direction. Therefore, the amount of reduction in the adjustment output (in other words, the amount of adjustment in coarse adjustment) by cutting the branch part 61C having each of the wide parts 63C1-63C5 can be made equal to each other, or mutual differences in the amount of reduction can be made smaller. As a result, coarse adjustment can be readily conducted.

Similarly, in the wide parts 63C6-63C9, among two adjacent ones of the wide parts 63C, one of the wide parts 63C on the tip end side of the adjustment vibration arm 241 in the y-axis direction is greater in width than the other wide part 63C on the base end side in the y-axis direction. By this structure, the amount of reduction in the adjustment output (in other words, the amount of adjustment in fine adjustment) by cutting the branch part 61C having each of the wide parts 63C6-63C9 can be made equal to each other, or mutual differences in the amount of reduction can be made smaller. As a result, fine adjustment can be readily conducted. By the sensor element in accordance with the fourth embodiment described above, excellent detection sensitivity can also be readily and securely exhibited.

Fifth Embodiment

Figure 16:
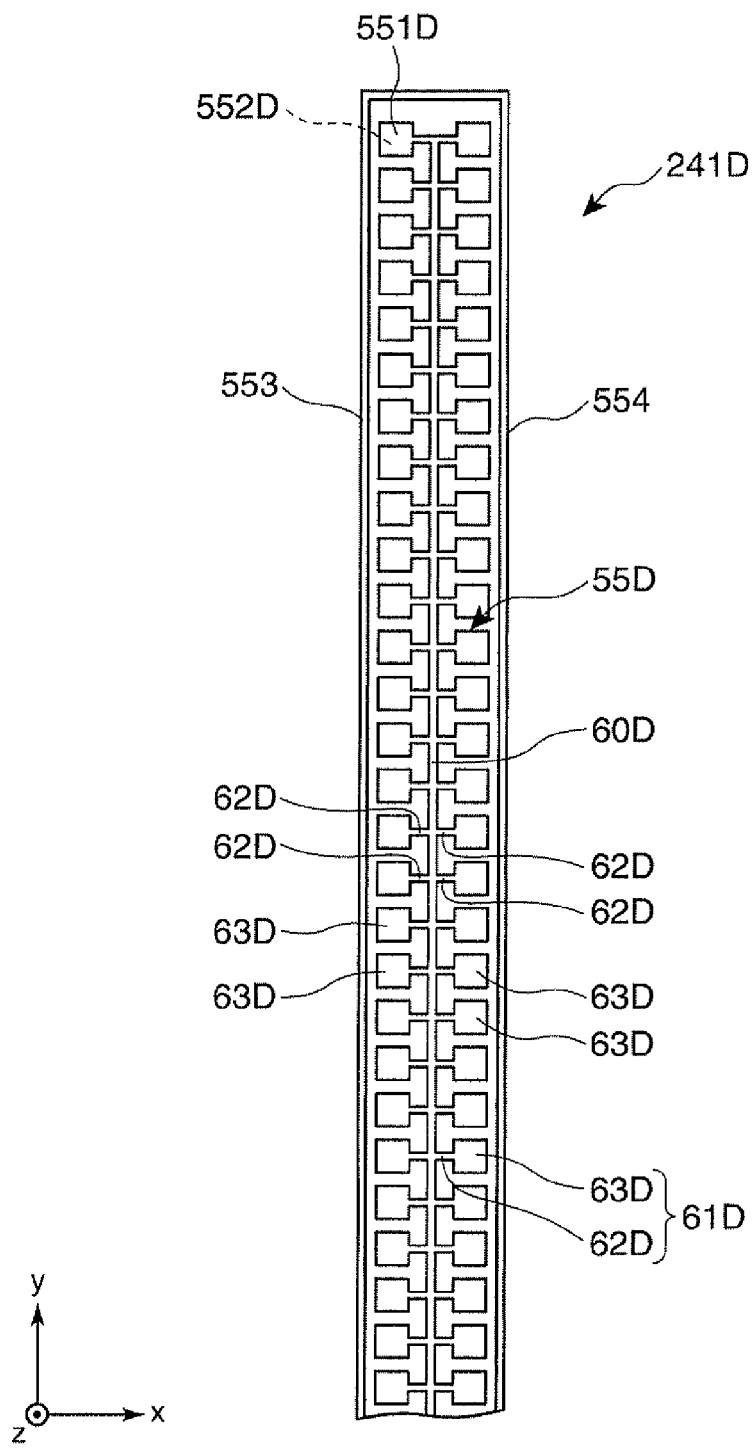
FIG. 16 is an enlarged plan view showing an adjustment vibration arm of a sensor element in accordance with a fifth embodiment of the invention.

Next, a fifth embodiment of the invention will be described. FIG. 16 is an enlarged plan view showing an adjustment vibration arm of a sensor element in accordance with the fifth embodiment. The sensor element in accordance with the fifth embodiment is similar to the sensor element in accordance with the first embodiment described above, except that the wide parts at the tips of the first adjustment vibration arm and the second adjustment vibration arm and the mass adjusting films are omitted, and the first adjustment electrode and the second adjustment electrode have different shapes.

Note that, in the following description of the sensor element of the fifth embodiment, aspects different from the embodiments described above will be mainly described and description of similar aspects will be omitted. Also, in FIG. 16, the same signs are assigned to the same configurations as those of the embodiments described above. The sensor element in accordance with the fifth embodiment has an adjustment vibration arm 241D (a first adjustment vibration arm) as shown in FIG. 16. Although not shown, similar to the first embodiment described above, the sensor element in accordance with the fifth embodiment includes a base part, a pair of drive vibration arms and a pair of detection vibration arms. Also, a first adjustment vibration arm paring with the adjustment vibration arm 241D, and a pair of second adjustment vibration arms configured similarly to the pair of first adjustment vibration arms extend from the base part.

An adjustment electrode group 55D is provided on the adjustment vibration arm 241D. The adjustment electrode group 55D is formed from an adjustment electrode 551D provided on the upper surface of the adjustment vibration arm 241D, an adjustment electrode 552D provided on the lower surface of the adjustment vibration arm 241D, an adjustment electrode 553 provided on one of the side surfaces of the adjustment vibration arm 241D, and an adjustment electrode 554 provided on the other of the side surfaces of the adjustment vibration arm 241D.

The adjustment electrode 551D will be described below in detail. Note that the adjustment electrode 552D is similar to the adjustment electrode 551D. The adjustment electrode 551D is equipped with a common part 60D and a plurality of branch parts 61D. The common part 60D is provided in a center section in the width direction of the adjustment vibration arm 241D as viewed in a plan view.

Each of the branch parts 61D has a narrow part 62D formed in a narrow width on the side of the common part 60D, and a wide part 63D formed in a wider width on the opposite side of the common part 60D. The branch parts 61D are provided on one side and the other side in the width direction of the common part 60D. By this structure, the common part 60D can be prevented or suppressed from functioning as the adjustment electrode 551D. Accordingly, adjustment of the sensor output can be readily performed. Also, the adjustment electrode 551D before adjustment (before the common part or the branch parts are cut midway) can secure a large electrode area. By the sensor element in accordance with the fifth embodiment described above, excellent detection sensitivity can also be readily and securely exhibited.

Sixth Embodiment

Figure 17A:
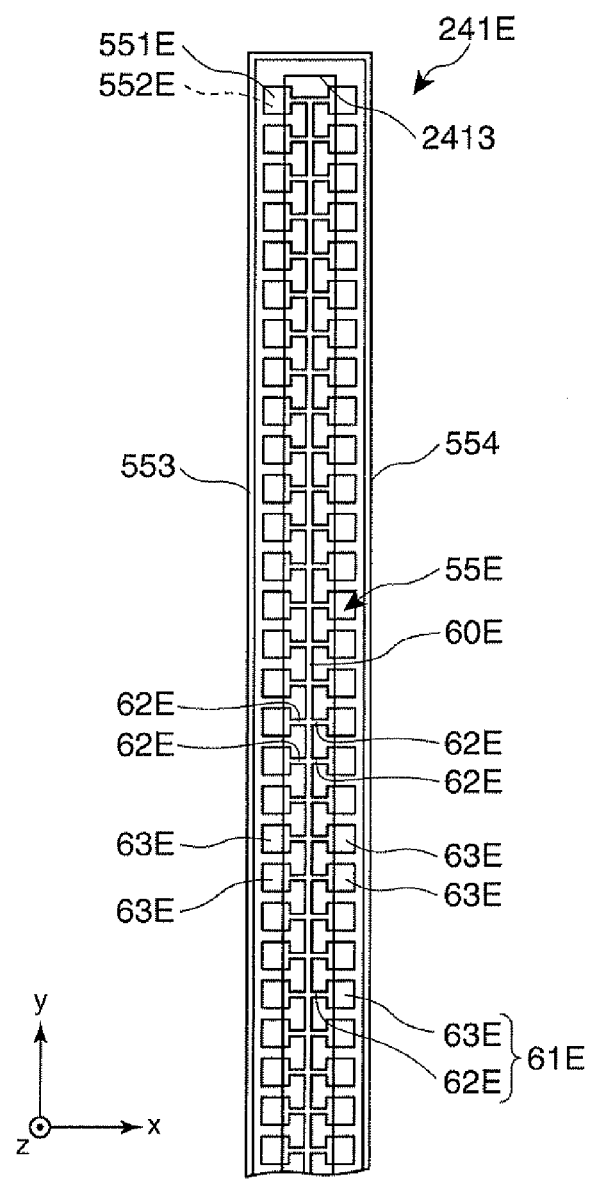
FIG. 17A is an enlarged plan view showing an adjustment vibration arm of a sensor element in accordance with a sixth embodiment of the invention.

Next, a sixth embodiment of the invention will be described. FIG. 17A is an enlarged plan view showing an adjustment vibration arm of a sensor element in accordance with the sixth embodiment. The sensor element in accordance with the sixth embodiment is similar to the sensor element in accordance with the first embodiment described above, except that the wide parts at the tips of the first adjustment vibration arm and the second adjustment vibration arm and the mass adjusting films are omitted, and the first adjustment electrode and the second adjustment electrode have different shapes. Also, the sensor element in accordance with the sixth embodiment is similar to the sensor element in accordance with the fifth embodiment described above, except that the first adjustment electrode and the second adjustment electrode have different cross-sectional shapes.

Note that, in the following description of the sensor element of the sixth embodiment, aspects different from the embodiments described above will be mainly described and description of similar aspects will be omitted. Also, in FIGS. 17A and 17B, the same signs are assigned to the same configurations as those of the embodiments described above.

Figure 17B:
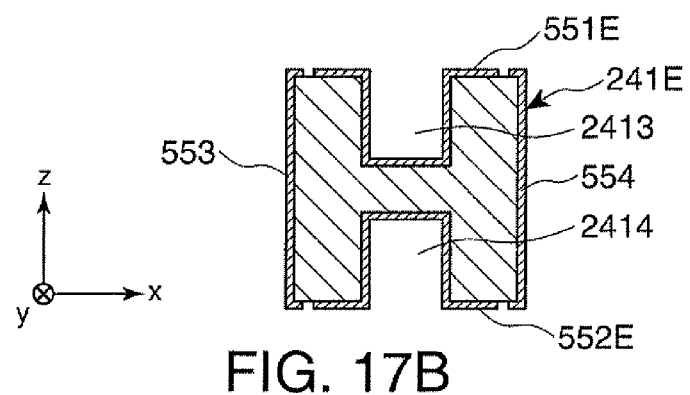
FIG. 17B is a cross-sectional view of the adjustment vibration arm shown in FIG. 17A.

The sensor element in accordance with the sixth embodiment has an adjustment vibration arm 241E (a first adjustment vibration arm) as shown in FIGS. 17A and 17B. Although not shown, similar to the first embodiment described above, the sensor element in accordance with the sixth embodiment includes a base part, a pair of drive vibration arms and a pair of detection vibration arms. Also, a first adjustment vibration arm paring with the adjustment vibration arm 241E, and a pair of second adjustment vibration arms configured similarly to the pair of first adjustment vibration arms extend from the base part.

The adjustment vibration arm 241E has an H-letter shape cross section. In a center section in the width direction of the upper surface of the adjustment vibration arm 241E, a groove part 2413 is formed along the y-axis direction. Similarly, in a center section in the width direction of the lower surface of the adjustment vibration arm 241E, a groove part 2414 is formed along the y-axis direction. Each of the groove parts 2413 and 2414 has a rectangular cross-sectional shape, and has wall surfaces extending in parallel with the side surfaces of the adjustment vibration arm 241E.

An adjustment electrode group 55E is provided on the adjustment vibration arm 241E. The adjustment electrode group 55E is formed from an adjustment electrode 551E provided on the upper surface of the adjustment vibration arm 241E, an adjustment electrode 552E provided on the lower surface of the adjustment vibration arm 241E, an adjustment electrode 553 provided on one of the side surfaces of the adjustment vibration arm 241E, and an adjustment electrode 554 provided on the other of the side surfaces of the adjustment vibration arm 241E.

The adjustment electrode 551E will be described below in detail. Note that the adjustment electrode 552E is similar to the adjustment electrode 551E. The adjustment electrode 551E is equipped with a common part 60E and a plurality of branch parts 61E. The common part 60E is provided in a center section in the width direction of the adjustment vibration arm 241E as viewed in a plan view.

Each of the branch parts 61E has a narrow part 62E formed in a narrow width on the side of the common part 60E, and a wide part 63E formed in a wider width on the opposite side of the common part 60E. The branch parts 61E are provided on one side and the other side in the width direction of the common part 60E.

In particular, a portion of each of the branch parts 61E is provided on the wall surface of the groove part 2413 (the wall surface in parallel with the side surface of the adjustment vibration arm 241E). By such a structure, the charge to be outputted from the adjustment electrode 551E can be made greater, and the amount of charge outputted from the adjustment electrodes 551E and 552E and the adjustment electrodes 553E and 554E can be made greater. For this reason, the range of adjusting the sensor output can be made wider. By the sensor element in accordance with the sixth embodiment described above, excellent detection sensitivity can also be readily and securely exhibited.

Seventh Embodiment

Figure 18:
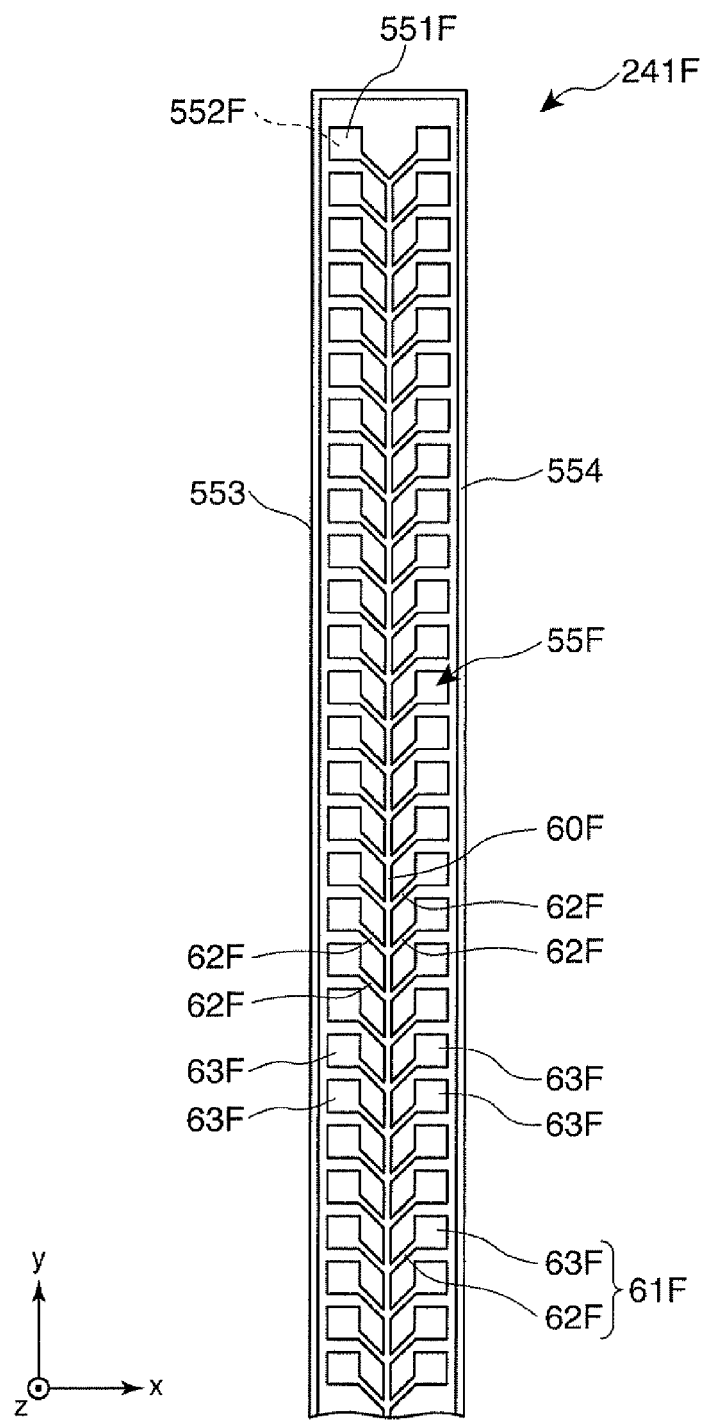
FIG. 18 is an enlarged plan view showing an adjustment vibration arm of a sensor element in accordance with a seventh embodiment of the invention.

Next, a seventh embodiment of the invention will be described. FIG. 18 is an enlarged plan view showing an adjustment vibration arm of a sensor element in accordance with the seventh embodiment. The sensor element in accordance with the seventh embodiment is similar to the sensor element in accordance with the first embodiment described above, except that the wide parts at the tips of the first adjustment vibration arm and the second adjustment vibration arm and the mass adjusting films are omitted, and the first adjustment electrode and the second adjustment electrode have different shapes. Also, the sensor element in accordance with the seventh embodiment is similar to the sensor element in accordance with the fifth embodiment described above, except that the narrow parts of the first adjustment electrode and the second adjustment electrode have different orientations.

Note that, in the following description of the sensor element of the seventh embodiment, aspects different from the embodiments described above will be mainly described and description of similar aspects will be omitted. Also, in FIG. 18, the same signs are assigned to the same configurations as those of the embodiments described above.

The sensor element in accordance with the seventh embodiment has an adjustment vibration arm 241F (a first adjustment vibration arm) as shown in FIG. 18. Although not shown, similar to the first embodiment described above, the sensor element in accordance with the seventh embodiment includes a base part, a pair of drive vibration arms and a pair of detection vibration arms. Also, a first adjustment vibration arm paring with the adjustment vibration arm 241F, and a pair of second adjustment vibration arms configured similarly to the pair of first adjustment vibration arms extend from the base part.

An adjustment electrode group 55F is provided on the adjustment vibration arm 241F. The adjustment electrode group 55F is formed from an adjustment electrode 551F provided on the upper surface of the adjustment vibration arm 241F, an adjustment electrode 552F provided on the lower surface of the adjustment vibration arm 241F, an adjustment electrode 553 provided on one of the side surfaces of the adjustment vibration arm 241F, and an adjustment electrode 554 provided on the other of the side surfaces of the adjustment vibration arm 241F.

The adjustment electrode 551F will be described below in detail. Note that the adjustment electrode 552F is similar to the adjustment electrode 551F. The adjustment electrode 551F is equipped with a common part 60F and a plurality of branch parts 61F. The common part 60F is provided in a center section in the width direction of the adjustment vibration arm 241F as viewed in a plan view.

Each of the branch parts 61F has a narrow part 62F formed in a narrow width on the side of the common part 60F, and a wide part 63F formed in a wider width on the opposite side of the common part 60F. In particular, each of the narrow parts 63F extends in a direction inclined with respect to the extension direction of the adjustment vibration arm 241F. By such a structure, at the time of cutting the narrow parts 62F by a laser beam, the narrow parts 62F can be cut by scanning the laser beam in either the x-axis direction or the y-axis direction. Accordingly, the branch parts 61F can be readily cut midway.

The branch parts 61F are provided on one side and the other side in the width direction of the common part 60F, respectively. By the sensor element in accordance with the seventh embodiment described above, excellent detection sensitivity can also be readily and securely exhibited. The sensor device in accordance with each of the embodiments described above can be implemented and used in various types of electronic apparatuses. Such electronic apparatuses can exhibit excellent reliability.

Electronic Apparatus

Here, examples of an electronic apparatus equipped with an electronic device in accordance with embodiments of the invention will be described in detail with reference to FIGS. 19-21.

Figure 19:
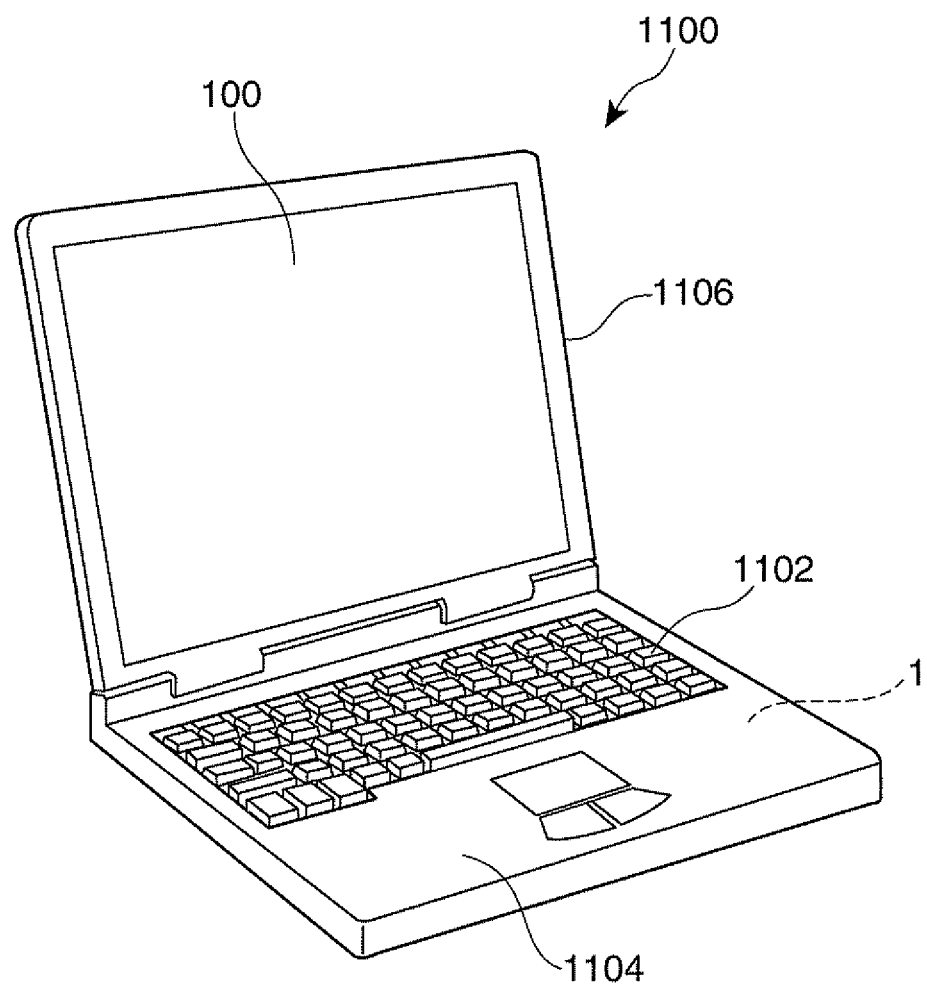
FIG. 19 is a perspective view showing the configuration of a mobile (notebook type) personal computer using an electronic apparatus in accordance with an aspect of the invention.

FIG. 19 is a perspective view showing the configuration of a mobile (or a notebook) personal computer 1100 in which an electronic apparatus in accordance with an embodiment of the invention is implemented. As shown in FIG. 19, the personal computer 1100 is configured with a main body 1104 equipped with a keyboard 1102, and a display unit 1106 equipped with a display section 100. The display unit 1106 is rotatably supported on the main body 1104 through a hinge structure. The sensor device 1 described above that functions as a gyro sensor is built in the personal computer 1100.

Figure 20:
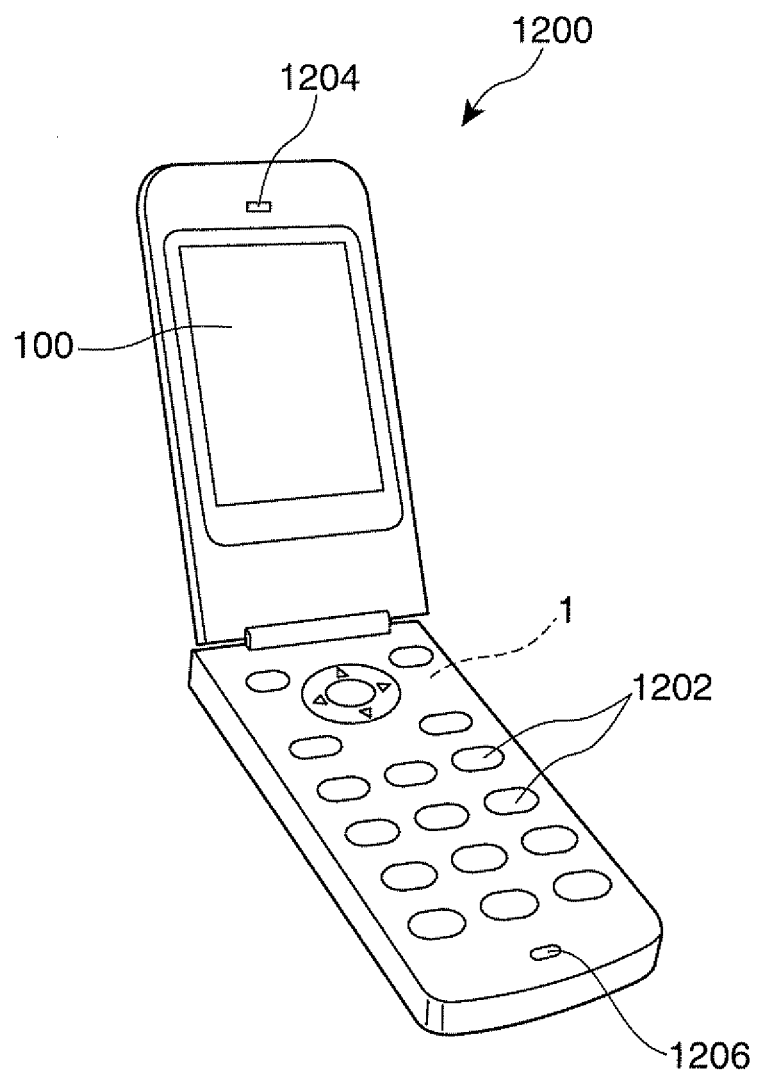
FIG. 20 is a perspective view showing the configuration of a portable phone (including PHS) using an electronic apparatus in accordance with an aspect of the invention.

FIG. 20 is a perspective view showing the structure of a portable phone (including a PHS) 1200 in which an electronic apparatus in accordance with an embodiment of the invention is implemented. As illustrated in the figure, the portable phone 1200 has plural operation buttons 1202, a receiver 1204 and a mouthpiece 1206, and a display section 100 disposed between the operation buttons 1202 and the receiver 1204. The sensor device 1 described above that functions as a gyro sensor is built in the portable telephone 1200.

Figure 21:
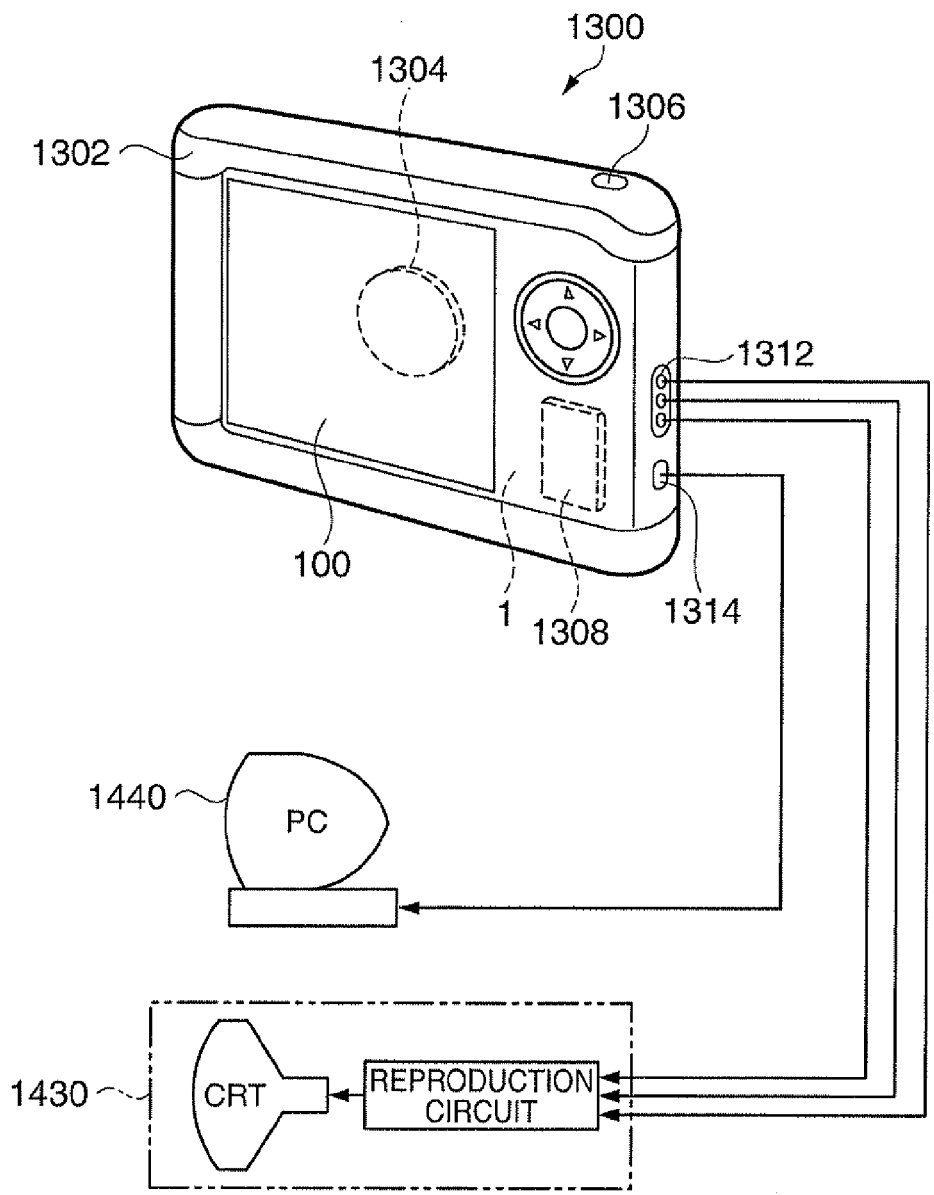
FIG. 21 is a perspective view showing the configuration of a digital still camera using an electronic apparatus in accordance with an aspect of the invention.

FIG. 21 is a perspective view showing the structure of a digital still camera 1300 in which an electronic apparatus in accordance with an embodiment of the invention is implemented. The figure also schematically shows connections with external apparatuses. In contrast to an ordinary analogue camera that exposes a silver halide photographic film to an optical image of an object, the digital still camera 1300 photoelectrically converts an optical image of an object by an imaging element such as a CCD (Charge Coupled Device), thereby generating an imaging signal (a picture signal).

The digital still camera 1300 has a case (body) 1302. A display section is provided at the rear surface of the case, and is configured to display an image based on the imaging signal provided by the CCD. The display section functions as a viewfinder to display the object as an electronic image. Also, the case 1302 is provided on its front side with a photo detection unit 1304 including an optical lens (an imaging optical system), a CCD and the like.

When the user presses a shutter button 1306 while visually confirming an object image displayed on the display section, imaging signals of the CCD at the moment are transmitted to and stored in a memory 1308. The digital still camera 1300 also includes video-signal output terminals 1312 and a data-communication input/output terminal 1314 on one side of the case 1302. As shown in the figure, the video-signal output terminals 1312 are connected to a monitor 1430 if necessary, and the data-communication input/output terminal 1314 is connected to a personal computer 1440 if necessary. With a predetermined operation, the imaging signals can be fed from the memory 1308 to the monitor 1430 and the personal computer 1440. The sensor device 1 described above that functions as a gyro sensor is built in the digital still camera 1300.

In addition to the personal computer (mobile personal computer) in FIG. 19, the portable phone in FIG. 20, and the digital still camera in FIG. 21, examples of electronic apparatuses in accordance with embodiments of the invention include, for example, self-position detection devices in vehicles, pointing devices, head-mount display devices, ink-jet devices (for example, ink jet printers), laptop personal computers, televisions, video cameras, video-tape recorders, car navigation systems, pagers, electronic organizers (with or without communications capabilities), electronic dictionaries, calculators, electronic game machines, gaming controllers, word processors, workstations, video phones, security monitors, electronic binoculars, POS terminals, medical equipment (such as electronic thermometers, blood pressure meters, blood glucose meters, electrocardiographic equipment, ultrasonic diagnostic equipment, and electronic endoscopes), fish finders, a variety of measuring equipment, a variety of instruments (such as those used for cars, aircrafts, and ships), flight simulators and the like.

Although the sensor elements, methods for adjusting characteristics of the sensor element, sensor devices and electronic apparatuses in accordance with the embodiments of the invention have been described above with reference to the drawings, the invention is not limited thereto. It is noted that the configuration of each of the components in the sensor elements, sensor devices and electronic apparatuses in accordance with the embodiments of the invention can be replaced with any other configuration that exhibits similar functions, and may be additionally provided with any desired configuration.

Also, for the sensor elements, sensor devices and electronic apparatuses in accordance with the embodiments of the invention, any arbitrary configurations in each of the embodiments described above may be combined together.

In the embodiments described above, examples in which the first adjustment vibration arms and the second vibration arms flexurally vibrate in mutually the same directions have been described. However, the invention is also applicable to a case where the first adjustment vibration arms and the second vibration arms flexurally vibrate in mutually opposite directions. In this case, the pair of first adjustment electrodes or the pair of second adjustment electrodes may be electrically connected to the pair of detection electrodes to have reverse polarities with respect to the embodiments described above.

Also, in the embodiments described above, examples in which the invention is applied to H-shape tuning fork sensor elements have been described. However, the invention is also applicable to various other types of sensor elements (gyro elements), such as, double-T type, double-ended tuning fork type, trident tuning fork type, comb-tooth type, orthogonal type, and square beam type sensor elements. Also, the number of the drive vibration arms, the detection vibration arms, the first adjustment vibration arms and the second adjustment vibration arms may be one or three or more. Also, the drive vibration arms may also function as detection vibration arms.

The number, the position, the shape and the size of each of the drive electrodes are not limited to the embodiments described above, as long as the drive vibration arms can be vibrated by energization. The number, the position, the shape and the size of each of the detection electrodes are not limited to the embodiments described above, as long as vibration of the drive vibration arms caused by application of a physical quantity can be electrically detected. Also, the number, the position, the shape and the size of each of the first adjustment electrodes and the second adjustment electrodes are not limited to the embodiments described above, as long as charges generated in response to vibration of the first adjustment vibration arms and the second adjustment vibration arms can be outputted.

The entire disclosure of Japanese Patent Application No. 2011-214425, filed Sep. 29, 2011 is expressly incorporated by reference herein.

What is claimed is:

1. A sensor element comprising:
a base part;
a drive vibration arm for vibrational drive, extending from the base part;
a first vibration arm and a second vibration arm that extend from the base part and vibrate in response to vibrational drive of the drive vibration arm;
a detection part including a detection electrode that outputs a signal according to a physical quantity applied to the drive vibration arm;
a first electrode provided on the first vibration arm and directly electrically connected to the detection electrode for generating a charge in response to vibration of the first vibration arm; and
a second electrode provided on the second vibration arm and directly electrically connected to the detection electrode for generating a charge in a reverse polarity with respect to the first electrode in response to vibration of the second vibration arm.

2. The sensor element according to claim 1, wherein an added charge of the charge from the first electrode and the charge from the second electrode is in a reverse polarity with respect to a charge generated at the detection electrode when no physical quantity is applied to the drive vibration arm.

3. The sensor element according to claim 1, wherein each of the first electrode and the second electrode has a pair of principal surface electrodes and a pair of side surface electrodes, and when the first vibration arm and the second vibration arm vibrate in mutually the same phase, the principal surface electrodes on the first electrode and the side surface electrodes on the second electrode are mutually connected, and the side surface electrodes on the first electrode and the principal surface electrodes on the second electrode are mutually connected.

4. The sensor element according to claim 1, wherein each of the first electrode and the second electrode has a pair of principal surface electrodes and a pair of side surface electrodes, and when the first vibration arm and the second vibration arm vibrate in mutually reverse phases, the principal surface electrodes on the first electrode and the principle surface electrodes on the second electrode are mutually connected, and the side surface electrodes on the first electrode and the side surface electrodes on the second electrode are mutually connected.

5. The sensor element according to claim 1, wherein at least one of the first electrode and the second electrode has a common part that extends in an extension direction of the first vibration arm or the second vibration arm, and plural branch parts branching out from the common part.

6. The sensor element according to claim 5, wherein each of the plural branch parts has an electrode width greater on the side of a tip portion thereof than on the side of the common part.

7. The sensor element according to claim 5, wherein the plural branch parts are inclined with respect to the extension direction of the common part.

8. The sensor element according to claim 5, wherein the plural branch parts branch out on both sides of the common part.

9. The sensor element according to claim 5, wherein at least one of the first vibration arm and the second vibration arm has a groove part provided along the extension direction thereof, and at least a portion of the plural branch parts is provided on a wall surface of the groove part.

10. The sensor element according to claim 1, wherein the first vibration arm and the second vibration arm are provided in one piece, and extend in mutually opposite directions.

11. The sensor element according to claim 1, wherein each of the first vibration arm and the second vibration arm has a mass adjustment section provided at a tip section thereof.

12. The sensor element according to claim 1, wherein the detection part has a detection vibration arm that extends from the base part, and vibrates according to a physical quantity applied to the drive vibration arm, and the detection electrode is provided on the detection vibration arm.

13. A method for manufacturing a sensor element that includes:
a base part;
a drive vibration arm for vibrational drive that extends from the base part;
a first vibration arm and a second vibration arm that extend from the base part and vibrate in response to vibrational drive of the drive vibration arm;

a detection part including a detection electrode that outputs a signal according to a physical quantity applied to the drive vibration arm;

a first electrode provided on the first vibration arm and electrically connected to the detection electrode for generating a charge in response to vibration of the first vibration arm; and a second electrode provided on the second vibration arm and electrically connected to the detection electrode for generating a charge in a reverse polarity with respect to the first electrode in response to vibration of the second vibration arm, the method comprising adjusting the amount of charge to be generated at the first electrode or the second electrode by removing a physical portion or entirety of the first electrode or the second electrode.

14. The method for manufacturing a sensor element according to claim 13, comprising:

before performing the charge adjustment, measuring a charge generated at the detection electrode in a state in which the drive vibration arm is energized to vibrate, and adjusting the resonance frequency of at least one of the first vibration arm and the second vibration arm based on the result of the measurement.

15. A sensor device comprising:

the sensor element recited in claim 1;

a circuit for driving the drive vibration arm; and a circuit for detecting an output from the detection electrode.

16. An electronic apparatus comprising the sensor element recited in claim 1.

* * * * *